United States Patent
Uehara et al.

(10) Patent No.: US 8,339,538 B2
(45) Date of Patent: Dec. 25, 2012

(54) DISPLAY DEVICE, TERMINAL DEVICE, LIGHT SOURCE DEVICE, AND OPTICAL MEMBER HAVING A LIGHT-DIRECTION RESTRICTING ELEMENT AND A TRANSPARENT/SCATTERING STATE SWITCHING ELEMENT

(75) Inventors: Shin-ichi Uehara, Tokyo (JP); Shinya Niioka, Tokyo (JP); Masao Imai, Tokyo (JP)

(73) Assignees: NLT Technologies, Ltd., Kanagawa (JP); NEC Corporation, Tokyo (JP)

( * ) Notice: Subject to any disclaimer, the term of this patent is extended or adjusted under 35 U.S.C. 154(b) by 644 days.

(21) Appl. No.: 11/408,113

(22) Filed: Apr. 21, 2006

(65) Prior Publication Data

US 2006/0238664 A1 Oct. 26, 2006

(30) Foreign Application Priority Data

Apr. 26, 2005 (JP) ................. 2005-128744

(51) Int. Cl.
*G02F 1/1335* (2006.01)
*F21V 17/02* (2006.01)
*F21V 7/04* (2006.01)

(52) U.S. Cl. .............. 349/64; 349/65; 349/66; 362/325; 362/607

(58) Field of Classification Search .................. 349/113, 349/61–66, 86; 362/325, 606, 607
See application file for complete search history.

(56) References Cited

U.S. PATENT DOCUMENTS

| | | | | |
|---|---|---|---|---|
| 3,797,914 A | * | 3/1974 | Aiken | 349/66 |
| 4,021,945 A | * | 5/1977 | Sussman | 40/448 |
| 4,807,978 A | * | 2/1989 | Grinberg et al. | 349/57 |
| 4,812,709 A | * | 3/1989 | Dudasik | 313/478 |
| 5,528,319 A | * | 6/1996 | Austin | 348/835 |
| 5,600,456 A | * | 2/1997 | Maruyama et al. | 349/66 |
| 6,199,995 B1 | * | 3/2001 | Umemoto et al. | 362/26 |
| 6,211,930 B1 | * | 4/2001 | Sautter et al. | 349/66 |
| 6,963,435 B2 | * | 11/2005 | Mallya et al. | 359/238 |
| 7,317,498 B2 | * | 1/2008 | Hara et al. | 349/62 |
| 2006/0056791 A1 | * | 3/2006 | Tzschoppe | 385/146 |

FOREIGN PATENT DOCUMENTS

| | | |
|---|---|---|
| CN | 1289054 A | 3/2001 |
| JP | 03-196087 A | 8/1991 |
| JP | 04-125536 A | 4/1992 |
| JP | 05-080421 A | 4/1993 |
| JP | 2622762 B2 | 11/1997 |
| JP | 2001-159704 A | 6/2001 |
| JP | 2001-324710 A | 11/2001 |
| JP | 2002-006143 A | 1/2002 |
| JP | 2003-131202 A | 5/2003 |
| JP | 2004-004763 A | 1/2004 |
| JP | 2004-212916 A | 7/2004 |

* cited by examiner

*Primary Examiner* — Mark Robinson
*Assistant Examiner* — Paisley L Arendt
(74) *Attorney, Agent, or Firm* — Sughrue Mion, PLLC

(57) ABSTRACT

A display device comprising a light source and having an optical waveguide, a louver, an anisotropic scattering sheet, and a transmissive liquid crystal panel disposed along the path of light emitted from the light source. The light-restricting direction of the louver is tilted at an angle α from the Y-axis direction. The value of the angle α is set so that the arrangement direction of moiré created between the louver and the liquid crystal panel approaches the X-axis direction. A plurality of belt-shaped convex portions extending in the Y-axis direction are formed on the surface of the anisotropic scattering sheet, and are configured so that the scattering direction of the light has anisotropy. Specifically, scattering in the X-axis direction is increased, and scattering in the Y-axis direction is reduced. Moiré can thereby be reduced in a display device having increased directivity of the display.

7 Claims, 18 Drawing Sheets

DISPLAY DEVICE, TERMINAL DEVICE, LIGHT SOURCE DEVICE, AND OPTICAL MEMBER HAVING A LIGHT-DIRECTION RESTRICTING ELEMENT AND A TRANSPARENT/SCATTERING STATE SWITCHING ELEMENT

BACKGROUND OF THE INVENTION

1. Field of the Invention

The present invention relates to a display device in which the directivity of the display is increased with respect to a specific direction, to a terminal device provided with this display device, and to a light source device and optical member incorporated into the aforementioned display device.

2. Description of the Related Art

Due to recent advances in technology, display panels have been deployed in a range of devices that includes monitors, television sets, and other large terminal devices; notebook-type personal computers, cash dispensers, vending machines, and other mid-sized terminal devices; and personal TVs, PDAs (Personal Digital Assistance: personal information terminal), mobile telephones, mobile gaming devices, and other small terminal devices that are used in a variety of locations. Because of their thin profile, light weight, small size, low energy consumption, and other advantages, display devices that use liquid crystals are particularly common in terminal devices.

Among these terminal devices, small-to-medium-sized terminal devices are characteristically used not only in closed rooms under tight security, but also in public places. It then becomes important to keep displays of private information and confidential information from being viewed by a third party. Particularly in recent years, occasions where private information and confidential information are displayed have increased in conjunction with the development of terminal devices, and demand for eavesdropping prevention techniques is increasing. A display device in which the display can be viewed only by a user positioned in front or in another specific direction, and eavesdropping from other directions is prevented by narrowing the range of angles in which the display is visible has been proposed together with an eavesdropping-preventing optical member applied to this display device (see Japanese Laid-Open Patent Application 2003-131202, for example: hereinafter referred to as Prior Art 1).

FIG. 22 is a sectional view showing the anti-eavesdropping device disclosed in Prior Art 1. This anti-eavesdropping device is affixed to the display surface of the display device and used. In this conventional anti-eavesdropping device as shown in FIG. 22, a thin anti-glare layer 1101 is provided, and a thin adhesive layer 1110 having high translucency is layered on and attached to the back surface of this anti-glare layer 1101. A silicone adhesive layer 1120 is also provided to the surface of the anti-glare layer 1101, and a translucent thin translucent layer 1130 is integrally bonded and layered via the silicone adhesive layer 1120. The anti-glare layer 1101, the adhesive layer 1110, and the translucent layer 1130 are each in the form of a flexible sheet or film. The surface of the adhesive layer 1110 on the opposite side from the anti-glare layer 1101 is a smooth, translucent attachment surface 1111 having a mirror finish, and is an attaching surface that can be detachably affixed to the display surface of the liquid crystal display (not shown in the drawing) of an information display device.

The anti-glare layer 1101 is formed by integrating a plurality of transparent silicone rubber sheets 1102 and a plurality of colored silicone rubber sheets 1103 arranged in alternating fashion in the direction parallel to the surface of the anti-glare layer 1101. The adjoining surfaces of the transparent silicone rubber sheets 1102 and the colored silicone rubber sheets 1103 are parallel to each other. The width, specifically, the thickness in the lateral direction of FIG. 22 of the transparent silicone rubber sheets 1102 and colored silicone rubber sheets 1103, is selected with consideration for the fact that the transparency and parallel light transmittance are determined by the ratio of the width of the transparent silicone rubber sheets 1102 to the width of the colored silicone rubber sheets 1103, and for the fact that the range of viewing angles is determined by the refractive index and width of the transparent silicone rubber sheets 1102 and the overall thickness of the anti-eavesdropping device. In Prior Art 1, the width of the transparent silicone rubber sheets 1102 is described as being 100 to 200 µm, for example, and preferably 120 to 150 µm; and the width of the colored silicone rubber sheets 1103 is described as being 10 to 50 µm, for example, and preferably 10 to 30 µm. According to Prior Art 1, by setting such values for the widths of the transparent silicone rubber sheets 1102 and colored silicone rubber sheets 1103, the anti-glare layer 1101 can be endowed with a parallel ray transmittance of approximately 80% or higher with a maximum of 85% or higher, and a visibility range of 90 to 120 degrees. According to Prior Art 1, the thickness of the anti-eavesdropping device is set to about 0.15 to 0.5 mm with consideration for the angle range of visibility, translucency, and handling, and is more preferably set to about 0.15 to 0.3 mm to enable attachment to the liquid crystal display of a small, thin mobile telephone or the like.

Affixing this type of anti-eavesdropping device to the display surface of a display device prevents light from exiting from the anti-eavesdropping device since light that is incident in a direction tilted with respect to the anti-eavesdropping device is absorbed by the colored silicone rubbers sheets forming a louver. Specifically, the anti-glare layer 1101 of the anti-eavesdropping device used for an information display demonstrates anti-eavesdropping effects. It is thereby impossible or extremely difficult for a third party present beside the user to see from the side or read the various types of information displayed when the anti-eavesdropping device is mounted on the liquid crystal display of the information display. Accordingly, since the information displayed on the information display is not leaked to a third party, the user of the information display can monitor and transmit information comfortably without worrying about eavesdropping.

However, the anti-eavesdropping device described in Prior Art 1 has such problems as those described below. Specifically, when the anti-eavesdropping device described in Prior Art 1 is attached to the display device, moiré occurs to a significant degree between the pixels of the display device and the colored silicone rubber sheets constituting the anti-eavesdropping device, and the display quality is severely reduced.

Techniques for suppressing moiré have been developed in the past to remedy this problem (see Japanese Patent No. 2622762, for example: hereinafter referred to as Prior Art 2). FIG. 23 is a diagram showing a conventional raster display device provided with a light control film disclosed in Prior Art 2; FIG. 24 is a top view showing the positioning of the light control film with respect to the display surface of the display device; and FIG. 25 is a graph showing the relationship between angle β and pitch p, wherein the angle β (degrees) between the raster of the display device and the stripes of the light control film is plotted on the horizontal axis, and the pitch p (mm) of the moiré stripes is plotted on the vertical axis.

As shown in FIG. 23, the raster display device 3102 described in Prior Art 2 is installed in an in-vehicle information display system, for example, and the in-vehicle information display system is composed of an automobile state detection device 3101, a CRT (Cathode Ray Tube) display device or other raster display device 3102 having a raster aligned so that the pitch is a, an information display controller 3103, a light control film 3104 for controlling the transmission direction of light, and an operating input device 3106. The light control film 3104 is attached to the display surface of the raster display device 3102. A user 3105 can see the raster display device 3102 through the light control film 3104.

The light control film 3104 controls the transmission direction of incident light, and has light-transmitting and light-blocking portions arranged in alternating stripes at a prescribed pitch therein. The light control film 3104 is reinforced by a glass plate. The light control film 3104 is also offset with respect to the raster display device 3102 so that the direction in which the stripes of the control film 3104 extend is tilted a prescribed angle β, for example, 10 degrees, with respect to the raster direction of the raster display device.

As shown in FIG. 24, a moiré bar whose pitch is p occurs at the intersection between the raster (indicated by straight line A) and the stripe (indicated by straight line B) when the display device 3102 and the light control film 3104 are viewed from the front. This moiré bar is indicated by the dotted line C. In this case, when the angle β is relatively small, the pitch p of the moiré bar can be computed using the Eq. 1 below, where a is the pitch of the raster, k is a coefficient, (a×k) is the pitch of the stripes, and B (degrees) is the angle formed by the extension direction of the raster and the extension direction of the stripes.

$$p = \frac{\left|\frac{a \times k}{\cos\beta}\right|}{\sqrt{(\tan\beta)^2 + \left(1 - \frac{k}{\cos\beta}\right)^2}} \quad [\text{Eq. 1}]$$

FIG. 25 is a diagram in which the abovementioned Eq. 1 is plotted. As shown in FIG. 25, the pitch p of the moiré bar decreases as the angle β increases, regardless of the size of the coefficient k. By making the pitch p of the moiré bar about the same or smaller than the pitch a of the raster, the moiré bar can be made less visible to the user. The angle β required to achieve this result is approximately 3 degrees or larger.

According to the description in Prior Art 2, a moiré bar is thus generated by the superposition of the light-blocking portions of the control film and the arrangement of the pixels in the image display device when a control film in which light-transmitting striped portions and light-blocking striped portions are arranged in alternating fashion and which is used to control the transmission direction of light is mounted for the purpose of preventing eavesdropping and the like on the display surface of an image display device in which a plurality of pixels are periodically arranged in two dimensions, and in which an arbitrary image is displayed. However, by tilting the extension direction of the control film stripes three degrees or more with respect to the arrangement direction of the pixels of the image display device, the pitch of the moiré bar can be made smaller than the arrangement pitch of the pixels, and the effect of moiré on the image can be reduced to a certain degree.

However, the above-described conventional technique has such problems as those described below. As described in Prior Art 2, moiré can be reduced to a certain degree by tilting the extension direction of the control film stripes with respect to the arrangement direction of the pixels of the image display device. However, moiré still occurs, and the moiré-reducing effects are inadequate. As described also in FIG. 3 of Prior Art 2, the period of the moiré increases particularly when the pitch of the opaque portions of the control film is near the pixel pitch of the display device. It is therefore impossible to adequately reduce moiré even when the control film is placed in a tilted position. In this case, when the tilt angle of the control film is increased in order to reduce moiré, the direction in which the light is restricted, specifically, the direction in which eavesdropping is prevented, is tilted from the horizontal direction, thus creating discomfort for the user.

SUMMARY OF THE INVENTION

An object of the present invention is to provide a display device capable of reducing moiré in a display device having increased display directivity, to provide a terminal device that uses the display device, and to provide a light source device and optical member that are incorporated into the display device.

The display device according to the present invention has a display panel in which a plurality of pixels are arranged in a matrix; a light-direction restricting element which is interposed in the path of the light incident on the display panel or the light exiting from the display panel, and which is provided with a plurality of transparent areas and a plurality of light-absorbing areas arranged in alternating fashion in a first direction that differs from the arrangement direction of the pixels; and anisotropic scattering unit for scattering incident light to a greater degree in the arrangement direction of moiré created between the display panel and the light-direction restricting element than in the first direction.

In the present invention, the light-direction restricting element restricts the direction of light in a first direction, and the anisotropic scattering unit scatters light to a greater degree in the arrangement direction of the moiré than in the first direction, whereby moiré can be obscured without compromising the light-direction restricting effects of the light-direction restricting element.

In this instance, the direction of maximum scattering by the anisotropic scattering unit is preferably one direction among the arrangement directions of the pixels. Discomfort during use can thereby be reduced since the scattering effects can be set perpendicular with respect to the side of the display device constituting the display surface.

Alternatively, the direction of maximum scattering by the anisotropic scattering unit is preferably the direction orthogonal to the first direction. It is thereby possible to more effectively prevent the light-direction restricting effects of the light-direction restricting element from being compromised.

The display panel, the light-direction restricting element, and the anisotropic scattering unit may also be arranged in sequence along the light path. A louver is thereby provided on the user side of the display panel, and the anisotropic scattering structure is formed in the louver. The user can therefore easily attach and detach a louver equipped with an anisotropic scattering structure according to the situation.

The display panel, the anisotropic scattering unit, and the light-direction restricting element may also be arranged in sequence along the light path. The anisotropic scattering unit can thereby be made to function as an anisotropic scattering adhesion layer, there is no need to provide a textured structure or other anisotropic scattering unit to the surface of the light-direction restricting element, and cost can be reduced.

Alternatively, the light-direction restricting element, the anisotropic scattering unit, and the display panel may be arranged in sequence along the light path. The display panel can thereby be disposed as far as possible towards the user. It is therefore possible to reduce the discomfort caused by a display that appears to be recessed into the device with respect to the outermost surface of the display device by an amount commensurate with the thickness of the member provided to the front surface of the display panel.

Furthermore, the anisotropic scattering unit may comprise a transparent substrate and a convex portion which extends in one direction and is formed on the surface of the transparent substrate. In this instance, the anisotropic scattering unit may be a one-dimensionally arranged prism sheet in which a plurality of prisms extending in one direction are arranged parallel to each other, or a lenticular lens in which a plurality of cylindrical lenses extending in one direction are arranged parallel to each other. The anisotropic scattering unit may also comprise a transparent substrate and a concave portion that extends in one direction and is formed on the surface of this transparent substrate.

Alternatively, the anisotropic scattering unit may be a convex portion formed on the surface of the light-direction restricting element or the surface of the display panel. In this instance, the anisotropic scattering unit may be a one-dimensionally arranged prism structure in which a plurality of prisms extending in one direction are arranged parallel to each other, or a lenticular lens structure in which a plurality of cylindrical lenses extending in one direction are arranged parallel to each other. The scattering anisotropy of the anisotropic scattering unit can thereby be enhanced. The anisotropic scattering unit may also be a concave portion formed on the surface of the light-direction restricting element or the surface of the display panel. The transparent substrate is thereby made unnecessary, and the thickness of the display device can therefore be reduced. The anisotropic scattering unit and the light-direction restricting element or transmissive liquid crystal panel are also optically bonded to each other. Therefore, interference fringes can be prevented from occurring, and the quality of the display can be even further enhanced.

Alternatively, the anisotropic scattering unit may be an anisotropic scattering adhesion layer for affixing the light-direction restricting element to the display panel. The anisotropic scattering unit may also be disposed inside the display panel. In this instance, the display panel may have an optical film, and the anisotropic scattering unit may be an anisotropic scattering adhesion layer for fixing the optical film to the substrate of the display panel. There is thereby no need to provide anisotropic scattering unit to the surface of the light-direction restricting element and the like, and cost can be reduced.

The display device according to the present invention may furthermore comprise a transparent/scattering state switching element which is capable of switching between a state for transmitting incident light and a state for scattering the light, and which is interposed in the path of the light that is incident on the display panel. The visible range of the display can thereby be changed by switching the transparent/scattering state switching element between the transparent state and the scattering state. In this instance, moiré can be reduced particularly in the transparent state, and excellent display quality can be achieved.

The anisotropic scattering unit in this instance is preferably an anisotropic scattering adhesion layer for affixing the transparent/scattering state switching element to the light-direction restricting element. There is thereby no need to provide an anisotropic scattering element, and thin profile and low cost can be achieved.

The display panel may also be a liquid crystal panel. The liquid crystal display panel in this instance is preferably a liquid crystal display panel that operates on a lateral field principle, a multi-domain vertical alignment principle, or a film-compensated TN principle. Contrast inversion of the display can thereby be minimized, and visibility can be enhanced when the transparent/scattering state switching element is in the scattering state.

Another display device according to the present invention has a light-direction restricting element provided with a plurality of transparent areas and a plurality of light-absorbing areas arranged in alternating fashion in a first direction; a transparent/scattering state switching element capable of switching between a state for transmitting the light incident from the light-direction restricting element and a state for scattering the light; and a display panel which displays an image by transmitting the light incident from the transparent/scattering state switching element, and in which a plurality of pixels are arranged in a matrix in a direction that differs from the first direction; wherein the transparent/scattering state switching element scatters incident light to a greater degree in the arrangement direction of moiré created between the display panel and the light-direction restricting element than in the first direction when in the light-transmitting state.

The terminal device according to the present invention has the aforementioned display device.

The direction of maximum scattering of light by the anisotropic scattering unit or the transparent/scattering state switching element is preferably the direction perpendicular to the screen of the terminal device. Eavesdropping from the lateral direction can thereby be effectively prevented when the terminal device is in use.

The terminal device according to the present invention may be a mobile telephone, a personal information terminal, a gaming device, a digital camera, a video camera, a video player, a notebook-type personal computer, a cash dispenser, or a vending machine.

The light source device according to the present invention has a planar light source for emitting light in a plane; a light-direction restricting element which is interposed in the path of the light and which is provided with a plurality of transparent areas and a plurality of light-absorbing areas arranged in alternating fashion in a first direction; and anisotropic scattering unit for scattering incident light to a greater degree in a direction other than the first direction.

This light source device can be built into a display panel and suitably used as a light source device for a display device that prevents eavesdropping and has reduced moiré.

Another light source device according to the present invention has a planar light source of emitting light in a plane; a light-direction restricting element which is interposed in the path of the light and which is provided with a plurality of transparent areas and a plurality of light-absorbing areas arranged in alternating fashion in a first direction; and a transparent/scattering state switching element capable of switching between a state for transmitting the light incident from the light-direction restricting element and a state for scattering the light; wherein the transparent/scattering state switching element scatters incident light to a greater degree in a direction other than the first direction when in the light-transmitting state.

The optical member according to the present invention has a light-direction restricting element provided with a plurality of transparent areas and a plurality of light-absorbing areas arranged in alternating fashion in a first direction; and anisotropic scattering unit which scatters incident light to a greater degree in a direction other than the first direction and which is integrally formed in the surface of the light-direction restricting element.

In the present invention, an optical member is obtained that is capable of reducing moiré when used in combination with a display panel.

Another optical member according to the present invention has a light-direction restricting element which is provided with a plurality of transparent areas and a plurality of light-absorbing areas arranged in alternating fashion in a first direction, and which scatters incident light to a greater degree in a direction other than the first direction when in the light-transmitting state.

According to the present invention, moiré can be reduced in a display device in which the directivity of the display is increased.

DESCRIPTION OF THE PREFERRED EMBODIMENTS

Figure 1:
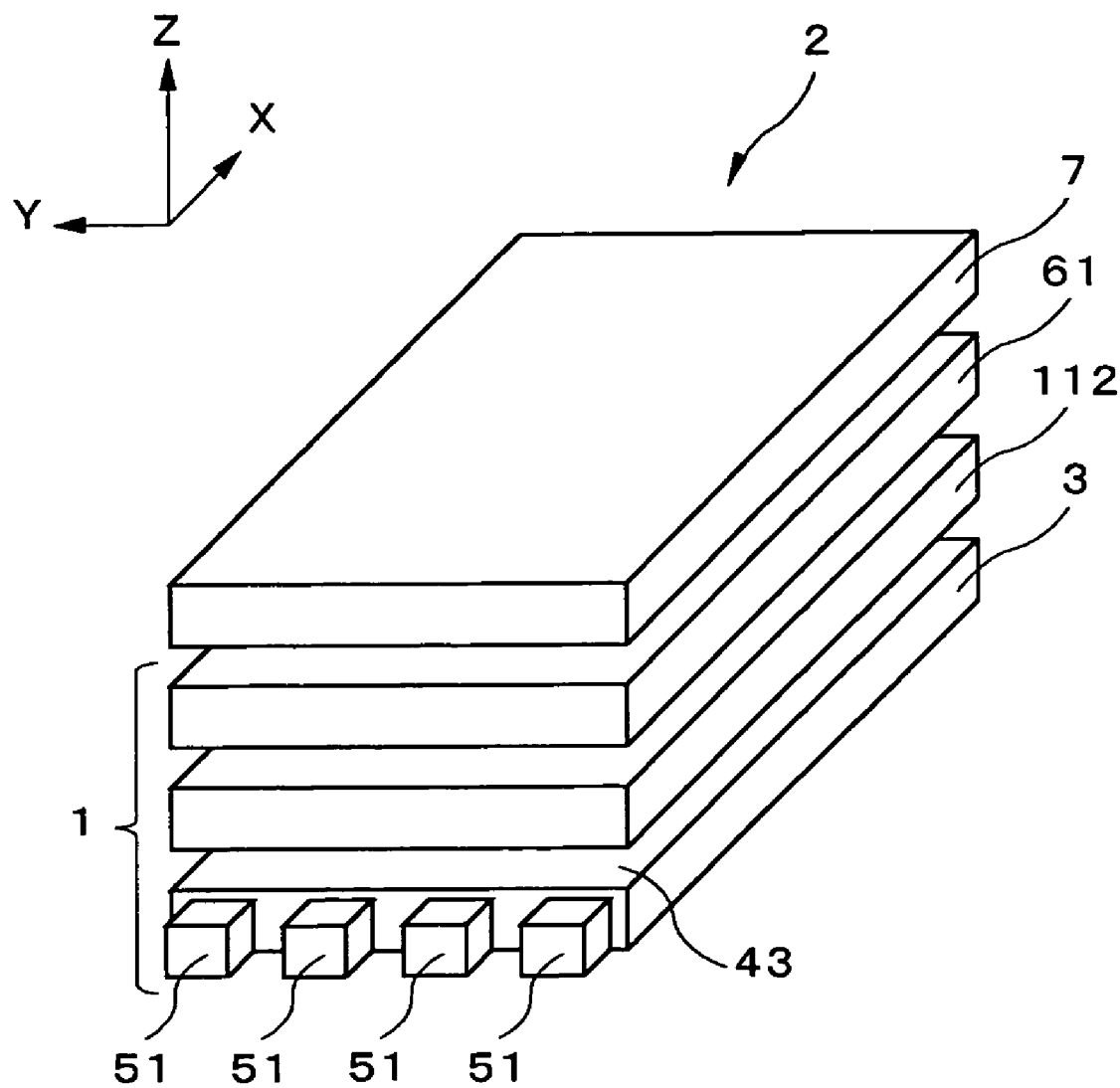
FIG. 1 is a perspective view showing the display device according to a first embodiment of the present invention.
Figure 2:
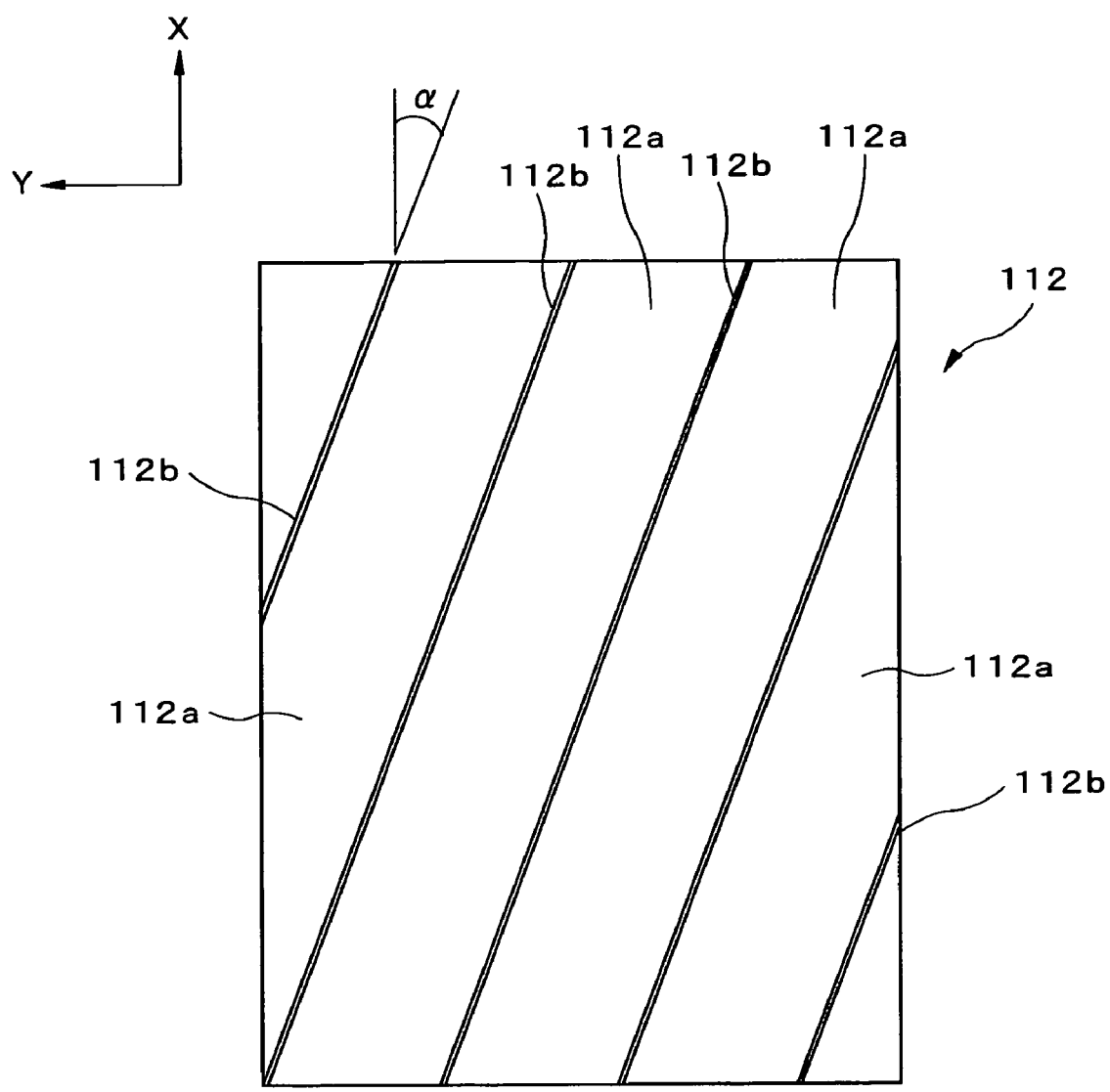
FIG. 2 is a top view showing a louver as the light-direction restricting element of the display device shown in FIG. 1.
Figure 3:
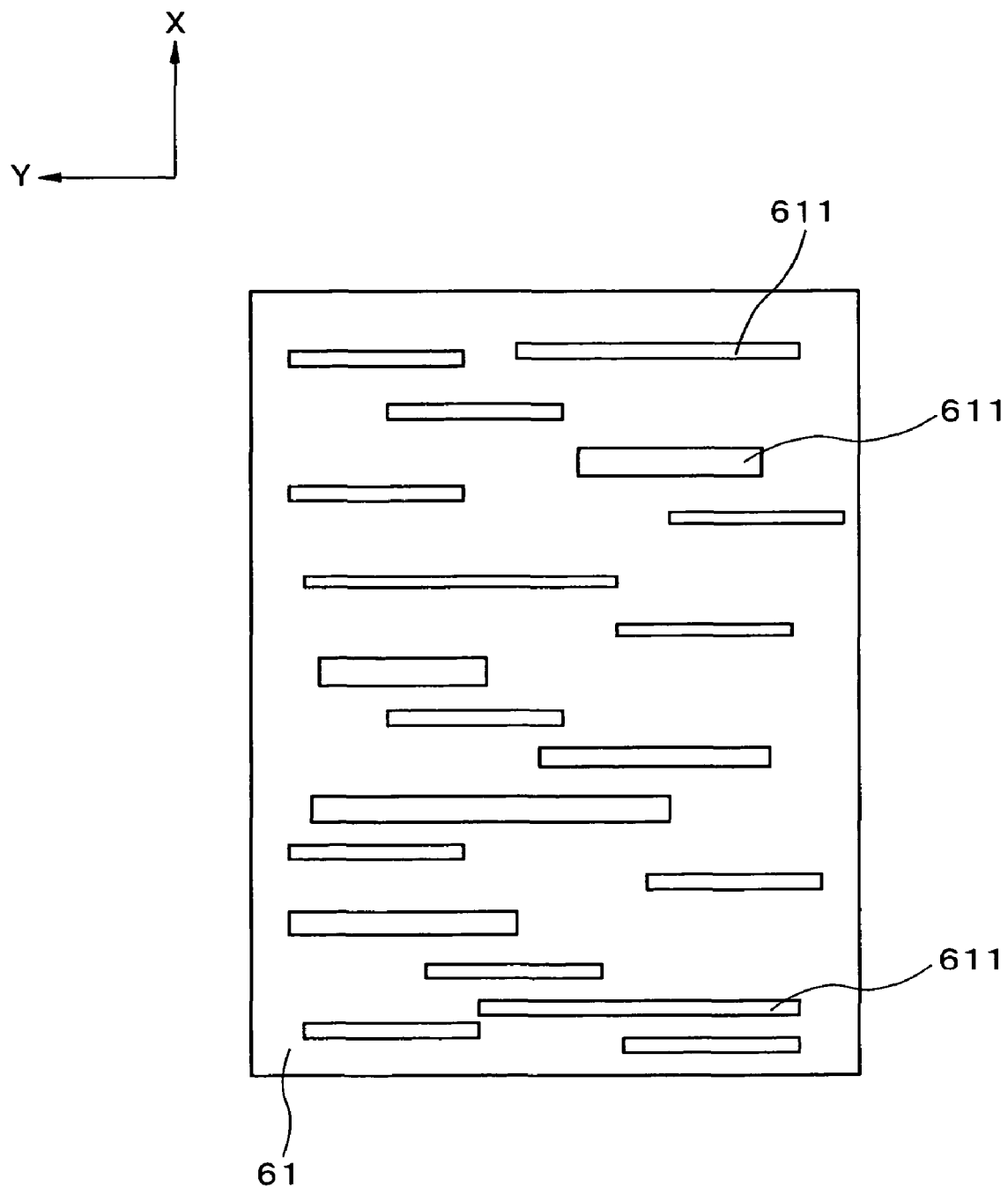
FIG. 3 is a top view showing the anisotropic scattering sheet of the display device shown in FIG. 1.
Figure 4:
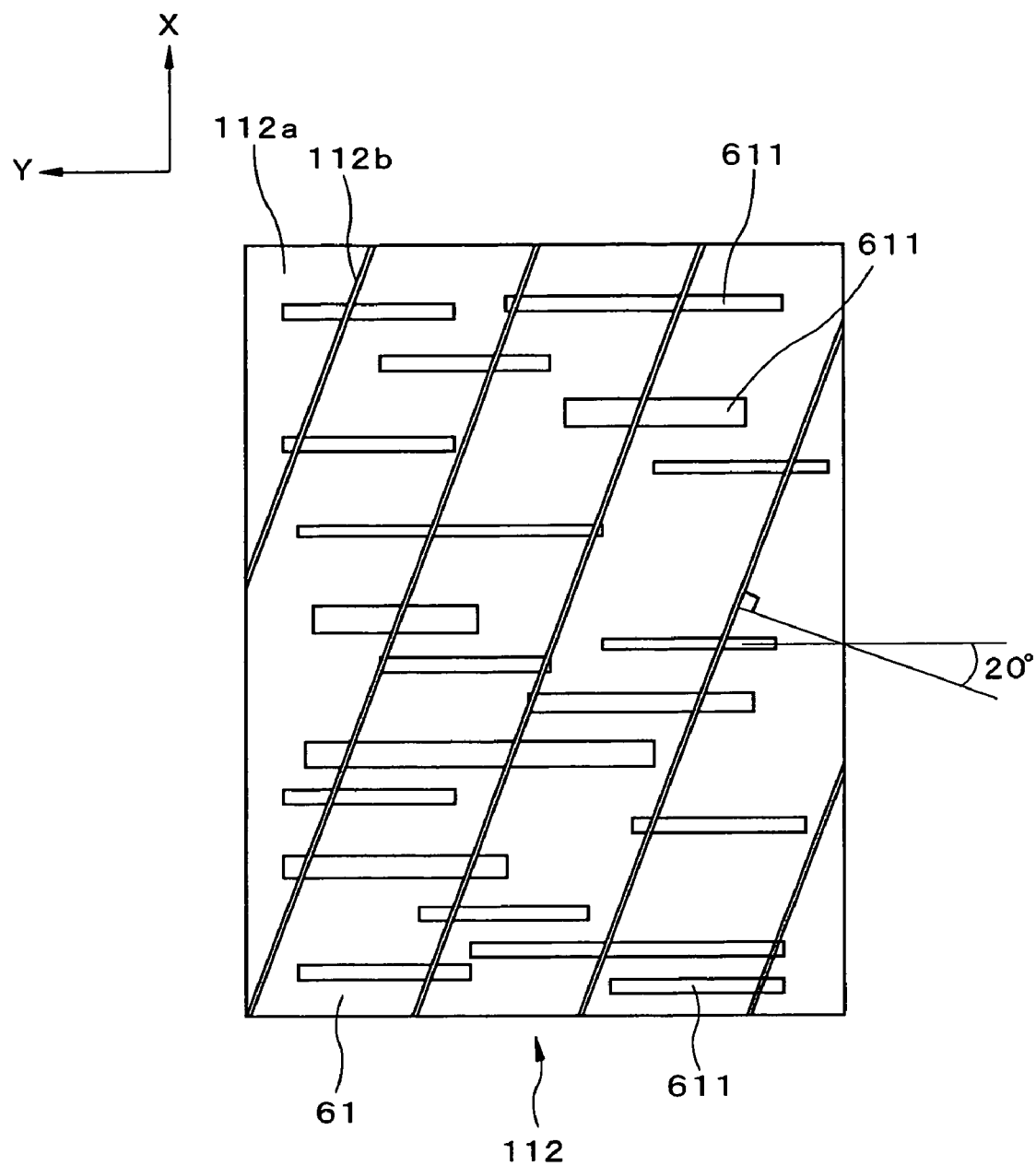
FIG. 4 is a top view showing the relationship between the light-restricting direction of the louver and the scattering direction of an anisotropic diffusion sheet.
Figure 5:
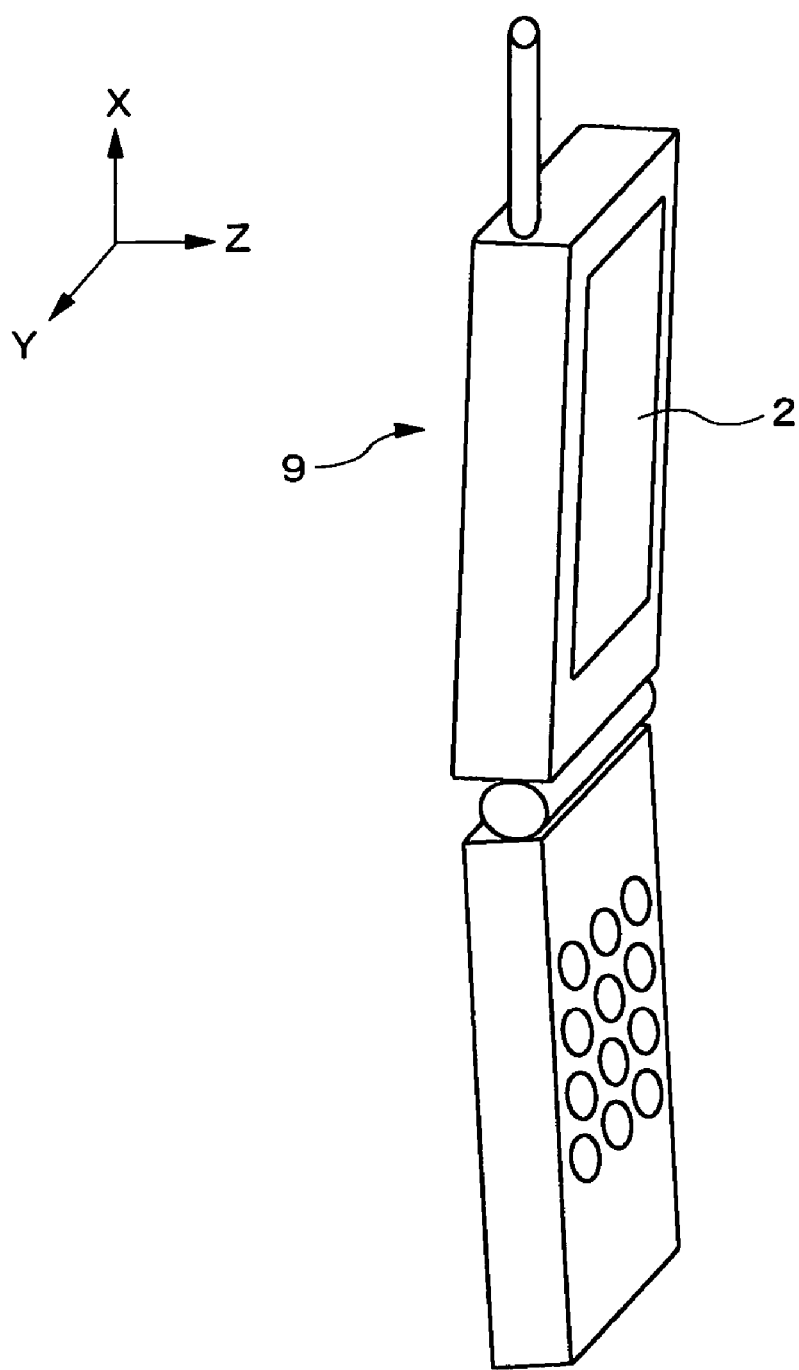
FIG. 5 is a perspective view showing the terminal device according to the present embodiment.

The display device, terminal device, light source device, and optical member according to embodiments of the present invention will be described in detail hereinafter with reference to the accompanying drawings. The display device, terminal device, light source device, and optical member according to a first embodiment of the present invention will first be described. FIG. 1 is a perspective view showing the display device according to the present embodiment; FIG. 2 is a top view showing a louver as the light-direction restricting element of the display device shown in FIG. 1; FIG. 3 is a top view showing the anisotropic scattering sheet of the display device shown in FIG. 1; FIG. 4 is a top view showing the relationship between the light-restricting direction of the louver and the scattering direction of an anisotropic diffusion sheet; and FIG. 5 is a perspective view showing the terminal device according to the present embodiment.

As shown in FIG. 1, a light source device 1 is provided in the display device 2 according to the first embodiment, and a transmissive liquid crystal panel 7 is provided on the light source device 1. The light source device 1 is provided with an optical waveguide 3; a light source 51 provided on the side surface of the optical waveguide 3; a louver 112 as a light-direction restricting element disposed on the front surface side, specifically, the user side of the optical waveguide 3; and an anisotropic scattering sheet 61 as an anisotropic scattering element disposed on the front surface side, specifically, the user side, of the louver 112. Specifically, an optical waveguide 3, a louver 112, an anisotropic scattering sheet 61, and a transmissive liquid crystal panel 7 are layered in sequence towards the user in the display device 2.

An XYZ orthogonal coordinate system is set up as described below for convenience in the present specification. The direction from the light source 51 to the optical waveguide 3 is the +X direction, and the opposite direction is the −X direction. The +X direction and the −X direction are collectively referred to as the X-axis direction. Within the direction parallel to the light-exiting surface 43 of the optical waveguide 3, the direction orthogonal to the X-axis direction is the Y-axis direction. Furthermore, the direction that is orthogonal to both the X-axis direction and the Y-axis direction is the Z-axis direction; and within the Z-axis direction, the direction from the optical waveguide 3 to the louver 112 is the +Z direction, and the opposite direction is the −Z direction. The +Z direction is the frontal direction, specifically, the direction towards the viewer. The +Y direction is the direction in which a right-handed coordinate system is established. Specifically, when the person's right thumb is in the +X direction, and the index finger is in the +Y direction, the middle finger is in the +Z direction.

The light source 51 is a point light source that emits light in the +X direction. In an example of the light source, four LEDs (Light-Emitting Diode), for example, are provided along the Y-axis direction. The optical waveguide 3 is a plate-shaped member composed of glass or another transparent material, for example, and the principal surface thereof is perpendicular to the Z-axis direction and arranged so that the light emitted from the light source 51 is incident on the surface that faces in the −X direction. The optical waveguide 3 emits light substantially uniformly in a plane from the light-exiting surface 43, specifically, from the principal surface facing in the +Z direction, while reflecting the light incident from the surface on the side of the −X direction between the principal surfaces, and propagating the light in the +X direction.

In the louver 112 as shown in FIG. 2, light-transmitting transparent areas 112a for transmitting light and absorbent areas 112b for absorbing light, for example, are formed and arranged in alternating fashion in the direction parallel to the surface of the louver 112. The transparent areas 112a and absorbent areas 112b are belt-shaped areas extending parallel to each other as viewed from the direction perpendicular to the surface of the louver 112, specifically, from the Z-axis direction, and the extension direction thereof is tilted at an angle α towards the −Y direction from the +X direction. Specifically, the direction in which the transparent areas 112a and the absorbent areas 112b are arranged in alternating fashion is tilted at an angle α towards the +X direction from the +Y direction. The angle α is set to 20 degrees, for example. The pitch at which the absorbent areas 112b are arranged is set to 140 μm, for example.

As shown in FIG. 3, anisotropic scattering structures 611 are formed on the surface of the anisotropic scattering sheet 61 facing in the +Z direction. The anisotropic scattering structures 611 are belt-shaped convex portions extending in the Y-axis direction, and a plurality thereof are formed on the surface of the anisotropic scattering sheet 61. Numerous anisotropic scattering structures 611 are thereby transected by a line traced in the X-axis direction on the surface of the anisotropic scattering sheet 61 that faces the +Z direction. This surface therefore has a great deal of irregularity in the X-axis direction. In contrast, a line traced in the Y-axis direction along this surface crosses few or no anisotropic scattering structures 611. This surface therefore has little irregularity in the Y-axis direction.

In more general terms, the surface of the anisotropic scattering sheet 61 has numerous irregularities in a specific direction, and has few irregularities in the direction orthogonal to this specific direction. In the present embodiment, the aforementioned specific direction in which there are more irregularities is set to the X-axis direction.

Therefore, the direction in which the transparent areas 112a and absorbent areas 112b of the louver 112 are arranged in alternating fashion is tilted 20 degrees with respect to the longitudinal direction (Y-axis direction) of the anisotropic scattering structures 611 of the anisotropic scattering sheet 61, as shown in FIG. 4.

The transmissive liquid crystal panel 7 displays information using the light emitted by the light source device 1 disposed behind the liquid crystal panel as viewed from the user side, and numerous pixels 71 (see FIG. 6) having transparent display areas are arranged therein in a matrix in the X-axis direction and the Y-axis direction shown in FIG. 1. The arrangement pitch of the pixels 71 is 150 μm, for example.

As shown in FIG. 5, the terminal device according to the present embodiment is a mobile telephone 9. The aforementioned display device 2 is installed in this mobile telephone 9. The X-axis direction of the display device 2 corresponds to the longitudinal direction of the screen of the mobile telephone 9, and the Y-axis direction corresponds to the transverse direction of the screen of the mobile telephone 9.

The operation of the display device according to the present embodiment thus configured will next be described. As shown in FIG. 1, the light source 51 emits light in the +X direction. This light enters the optical waveguide 3 from the side facing the −X direction, and is propagated through the optical waveguide 3 while being totally reflected by the surface thereof. A portion of the light at this time is emitted from the light-exiting surface 43 of the optical waveguide 3. As a result, light is emitted with substantial uniformity in a plane from the entire light-exiting surface 43 of the optical waveguide 3.

The light emitted from the optical waveguide 3 enters the louver 112. Among the light entering the louver 112, the light that is incident on the absorbent areas 112b (see FIG. 2) is absorbed and blocked by the absorbent areas 112b. The light that is propagated through only the transparent areas 112a without entering the absorbent areas 112b is emitted from the louver 112. Accordingly, among the light rays incident on the louver 112, the light rays that are tilted from the +Z direction at an angle equal to or greater than a specific angle in the direction (hereinafter referred to as the light regulating direction) in which the transparent areas 112a and absorbent areas 112b are alternately arranged are always incident on the absorbent areas 112b, and do not pass through the louver 112. As a result, in the light-restricting direction, the angle of tilt from the +Z direction of the direction of the light emitted from the louver 112 is kept within a range of angles that are smaller than a specific angle. Specifically, the directivity is increased. In contrast, since this type of restriction does not operate for the direction orthogonal to the light-restricting direction, the directivity in this direction is not increased.

The light emitted from the louver 112 is incident on the anisotropic scattering sheet 61. As previously mentioned, belt-shaped anisotropic scattering structures 611 (see FIG. 3) extending in the Y-axis direction are formed in the anisotropic scattering sheet 61, and the density of irregularities in the surface of the anisotropic scattering sheet 61 is high in the X-axis direction and low in the Y-axis direction. The light that is incident on the anisotropic scattering sheet 61 is therefore scattered by the anisotropic scattering structures 611, but the scattering has high anisotropy in the X-axis direction and low anisotropy in the Y-axis direction.

The light that is scattered mainly in the X-axis direction and emitted from the anisotropic scattering sheet 61 is incident on the transmissive liquid crystal panel 7. The light passes through the transmissive liquid crystal panel 7, whereby the image displayed by the transmissive liquid crystal panel 7 is associated with the light, and the light is emitted from the display device 2. An image can thereby be displayed.

Figure 6:
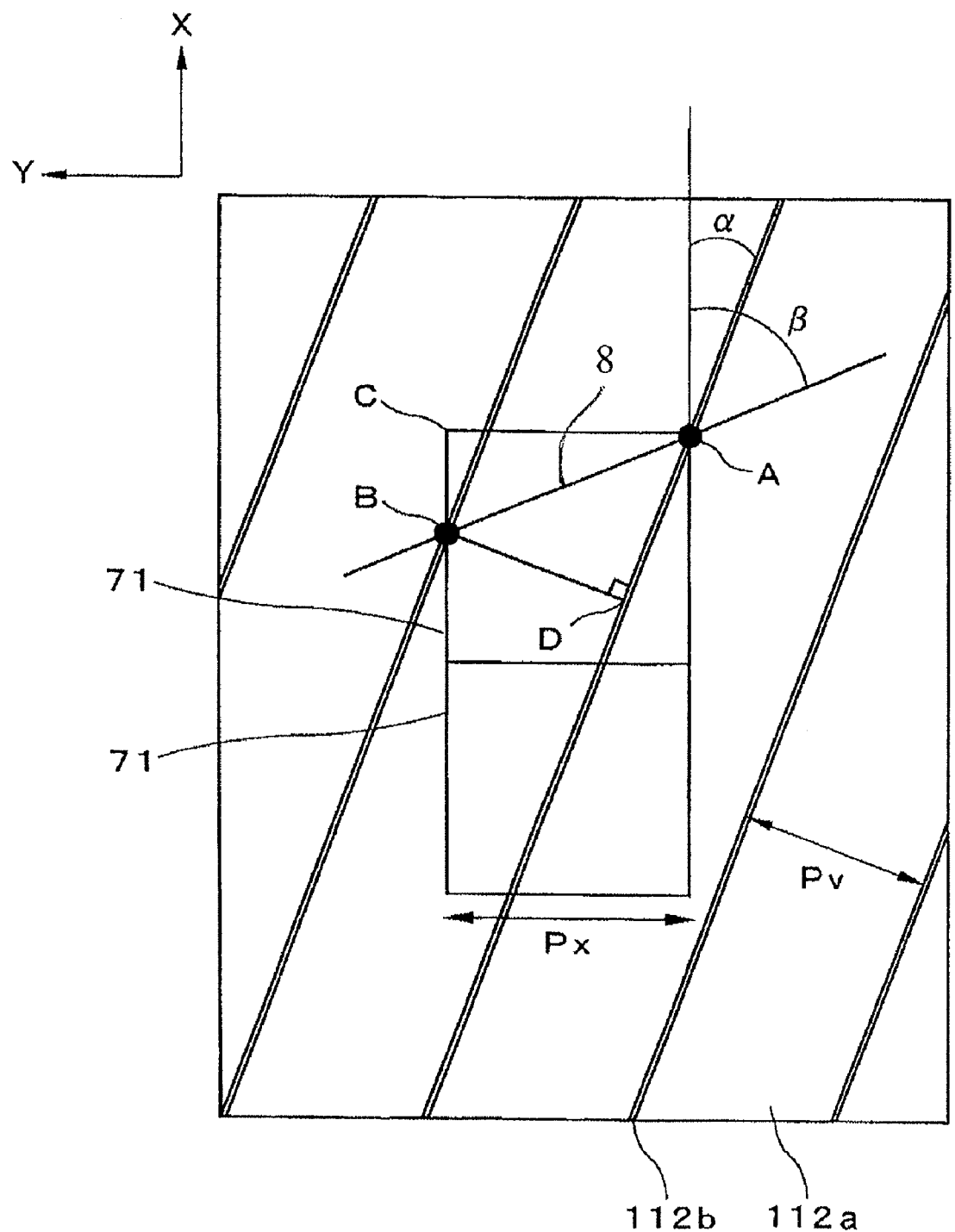
FIG. 6 is a top view showing the relationship between the light-restricting direction of the louver and the pixel arrangement direction of the transmissive liquid crystal panel in the present embodiment.

Following is a more-detailed description of the operation by which the anisotropic scattering sheet 61 prevents the occurrence of the moiré that commonly tends to occur between the louver 112 and the transmissive liquid crystal panel 7. FIG. 6 is a top view showing the relationship between the light-restricting direction of the louver and the pixel arrangement direction of the transmissive liquid crystal panel. As previously mentioned, the extension direction of the transparent areas 112a and absorbent areas 112b in the louver 112 is tilted from the X-axis direction at an angle α. Therefore, the arrangement direction (light-restricting direction) of the transparent areas 112a and absorbent areas 112b is tilted from the Y-axis direction at an angle α. The angle α is 20 degrees, for example, and the arrangement pitch of the absorbent areas is 140 μm, for example. As also previously mentioned, the pixels 71 of the display panel 7 are arranged in a matrix in the X-axis direction and Y-axis direction, and the arrangement pitch thereof is set to 150 μm.

Figure 7:
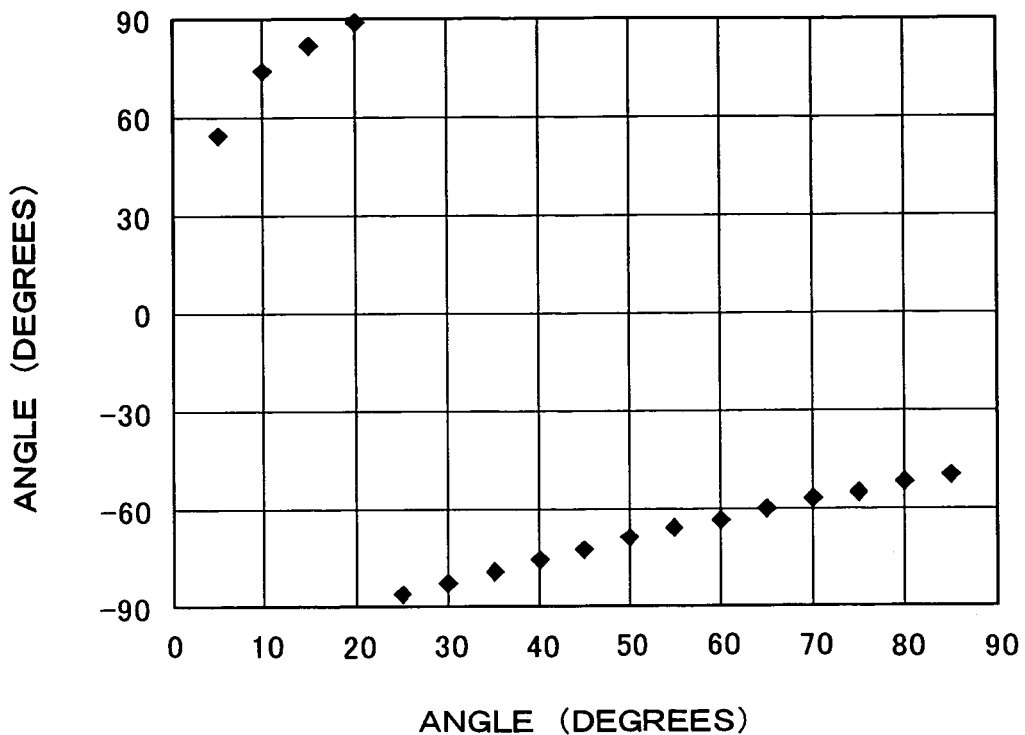
FIG. 7 is a graph in which the abovementioned Eq. 3 is plotted for angle α, wherein the angle α is plotted on the horizontal axis and the angle β is plotted on the vertical axis.

As is shown in FIG. 6, if it is assumed that the corner on the (+X, −Y) side of a pixel 71 is point A and that the center line of an absorbent area 112b passes through this point A as viewed from the Z-axis direction, then point B will be the point of intersection between the absorbent area 112b that faces the +Y direction and is adjacent to this absorbent area 112b and the side of this pixel 71 that extends in the Y-axis direction, point C will be the corner portion on the (+X, +Y) side of this pixel 71, and point D will be the foot of the perpendicular line drawn downward from point B onto the center line of the absorbent area 112b that includes point A. If the anisotropic scattering sheet 61 were not provided, the straight line 8 linking point A and point B would be the direction in which moiré extends. The hypotenuse AB of the right triangle ABC is the same as the hypotenuse AB of the right triangle ABD, giving Eq. 2 below, where β is the angle formed by this moiré direction and the X-axis direction, Pv is the arrangement pitch of the absorbent areas 112b of the louver 112, and Px is the arrangement pitch of the pixels 71. Furthermore, angle β is indicated by Eq. 3 below when Eq. 2 is solved. FIG. 7 is a graph in which the abovementioned Eq. 3 is plotted for angle α, wherein the angle α is plotted on the horizontal axis and the angle β is plotted on the vertical axis. In FIG. 7, the pitch Pv of the absorbent areas is 140 μm, and the pixel pitch Px is 150 μm.

$$\frac{Px}{\cos(90° - \beta)} = \frac{Pv}{\sin(\beta - \alpha)} \quad \text{[Eq. 2]}$$

$$\beta = \arctan\left(\frac{Px \times \sin\alpha}{Px \times \cos\alpha - Pv}\right) \quad \text{[Eq. 3]}$$

When 20 degrees for angle α, 140 μm for the pitch Pv of the absorbent areas of the louver, and 150 μm for the pixel pitch Px are substituted into the abovementioned Eq. 3, the angle β between the moiré direction (extension direction of the straight line 8) and the X-axis direction is computed as 89 degrees. Specifically, the moiré direction is substantially parallel to the Y-axis direction. Accordingly, if the anisotropic scattering sheet 61 were not provided, the user would recognize moiré that is arranged substantially in the X-axis direction and extends substantially in the Y-axis direction. Specifically, in the mobile telephone 9 (see FIG. 5) it would be possible to observe moiré that extends in the substantially horizontal direction of the screen and is arranged in the substantially perpendicular direction.

Moiré that occurs between the louver 112 and the display panel 7 thus extends substantially in the Y-axis direction, and is arranged in the substantially X-axis direction. On the other hand, the anisotropic scattering sheet 61 is capable of scattering light mainly in the X-axis direction. Specifically, the direction of maximum scattering of light by the anisotropic scattering sheet 61 is perpendicular to the screen of the mobile telephone 9. As a result, light can be scattered in the arrangement direction of the moiré, and the moiré can be obscured. Since the light-scattering effects are minimal in directions other than the arrangement direction of the moiré, there is little decrease in the directivity of the light restricted by the louver 112.

Since the light-restricting direction of the louver 112 is tilted 20 degrees from the Y-axis direction in which the scattering effects of the anisotropic scattering sheet 61 are at minimum, the light-direction restricting effects of the louver 112 are somewhat compromised. Since the light-restricting direction of the louver 112 is tilted 20 degrees from the Y-axis direction, specifically, from the horizontal direction of the screen of the mobile telephone 9, the light-restricting effects of the louver 112 become asymmetrical to the left and right. However, the anisotropic scattering effects are symmetrical with respect to the X-axis direction, and are therefore symmetrical to the left and right in the screen of the mobile telephone 9. Therefore, the left-right asymmetry of the light-restricting effects of the louver 112 can be supplemented to a certain degree, and the discomfort caused by the tilted placement of the louver can be reduced.

As is apparent from FIG. 6, the arrangement direction of the moiré coincides with the Y-axis direction when the angle α is 0 degrees. In this case, the light must also be scattered in the Y-axis direction in order for the moiré to be obscured by the anisotropic scattering sheet 61, and the light-restricting effects of the louver 112 are cancelled out. However, as shown in FIG. 7, when the angle α is an angle other than 0 degrees, specifically, when the light-restricting direction of the louver 112 is tilted with respect to the arrangement direction of the pixels in the transmissive liquid crystal panel 7, the angle β is different from 0 degrees, and the arrangement direction of the moiré is tilted with respect to the light-restricting direction. Therefore, by providing the anisotropic scattering sheet 61 and scattering the light anisotropically, moiré can be obscured while the light-restricting effects are maintained. The angle α is preferably made as small as possible, and the light-restricting direction of the louver 112 is preferably caused to approach the Y-axis direction in order to effectively obtain anti-eavesdropping effects in the mobile telephone 9. However, as shown in FIG. 7, the angle β most closely approaches 90 degrees when the angle α is approximately 20 degrees, and the arrangement direction of the moiré approaches the X-axis direction. The angle α is therefore preferably greater than 0 degrees and less than or equal to 20 degrees, and is preferably 20 degrees, for example.

The effects of the present embodiment will next be described. As previously mentioned, moiré occurs between the louver 112 and the liquid crystal panel 7 if the anisotropic scattering sheet 61 is not provided. In contrast, by tilting the light-restricting direction of the louver 112 away from the pixel arrangement direction of the liquid crystal panel 7 in the present embodiment, the arrangement direction of the moiré can be made different from the light-restricting direction of the louver 112. Moreover, by providing the anisotropic scattering sheet 61, the anisotropic scattering structures 611 formed along the Y-axis direction can be caused to scatter incident light anisotropically, and to scatter the light to a large extent in the arrangement direction of the moiré, and only to a small degree in the light-restricting direction. Moiré can thereby be reduced without significantly compromising the light-restricting effects of the louver 112. As a result, the directivity of light in the frontal direction can be increased, and excellent display quality can be achieved without significantly compromising the anti-eavesdropping effects.

The pitch of the absorbent areas of the louver, the light-restricting direction, the pixel pitch of the liquid crystal panel, and the extension direction of the anisotropic scattering structures of the anisotropic scattering sheet in the present embodiment are not limited to the abovementioned values, and may be appropriately modified in ranges that have the same effects, as described above. Specifically, even when the pitch Pv of the absorbent areas and the pixel pitch Px of the liquid crystal panel are set to values other than those described above, the same effects as those of the present embodiment are obtained if the value of angle α at which angle β is approximately 90 degrees is computed based on the abovementioned Eq. 3.

An example was described in the present embodiment in which the components are arranged in the sequence "transmissive liquid crystal panel"→"anisotropic scattering sheet"→"louver" as viewed in the +Z direction, that is, from the user side. However, the present invention is not necessarily limited by this sequence, and the appropriate sequence of arrangement of the components may be changed insofar as the same effects are obtained. Examples of such arrangements besides the abovementioned sequence include the sequence "anisotropic scattering sheet"→"transmissive liquid crystal panel"→"louver"; the sequence "anisotropic scattering sheet"→"louver"→"transmissive liquid crystal panel"; the sequence "louver"→"anisotropic scattering sheet"→"transmissive liquid crystal panel"; and other sequences. In this case, however, it is possible to further reduce the discomfort caused by a display that appears to be recessed into the device with respect to the outermost surface of the display device by an amount commensurate with the thickness of the member provided to the front surface of the display panel when the transmissive liquid crystal panel is disposed as close to the user side as possible.

Furthermore, an example was described in the present embodiment in which the anisotropic scattering structures 611 are convex portions formed on the surface facing the +Z direction of the anisotropic scattering sheet 61. However, the anisotropic scattering structures 611 may be formed on the surface facing the −Z direction of the anisotropic scattering sheet 61, and may be concave rather than convex. Any anisotropic scattering sheet may be used insofar as it scatters light in anisotropic fashion. For example, a template may be prepared in which an anisotropic scattering pattern is machined, and a film may be used on which the pattern of the template is transferred by a hot embossing method or a 2P method; a holographic diffuser may be used in which a one-dimensional hologram pattern is formed; or a common isotropic scattering sheet may be used that is stretched to create anisotropic properties.

An example was described in the present embodiment in which a transmissive liquid crystal panel is used as the display panel. However, the present invention is not limited to this configuration, and any panel that has a transmissive area in each pixel may be used. A transflective liquid crystal panel having a reflective area in a portion of each pixel, a visible-everywhere transflective liquid crystal panel, or a micro-reflective liquid crystal panel may also be used. The display panel is also not limited to a liquid crystal panel, and any display panel that uses a light source device may be used.

The terminal device was also described as being a mobile telephone in the present embodiment, but the present invention is not limited by this configuration, and may be applied to PDAs, personal TVs, gaming devices, digital cameras, digital video cameras, notebook-type personal computers, and various other types of mobile terminal devices. The display device may be installed not only in mobile terminal devices, but in cash dispensers, vending machines, monitors, television receivers, and other various types of fixed-mount terminal devices.

Figure 8:
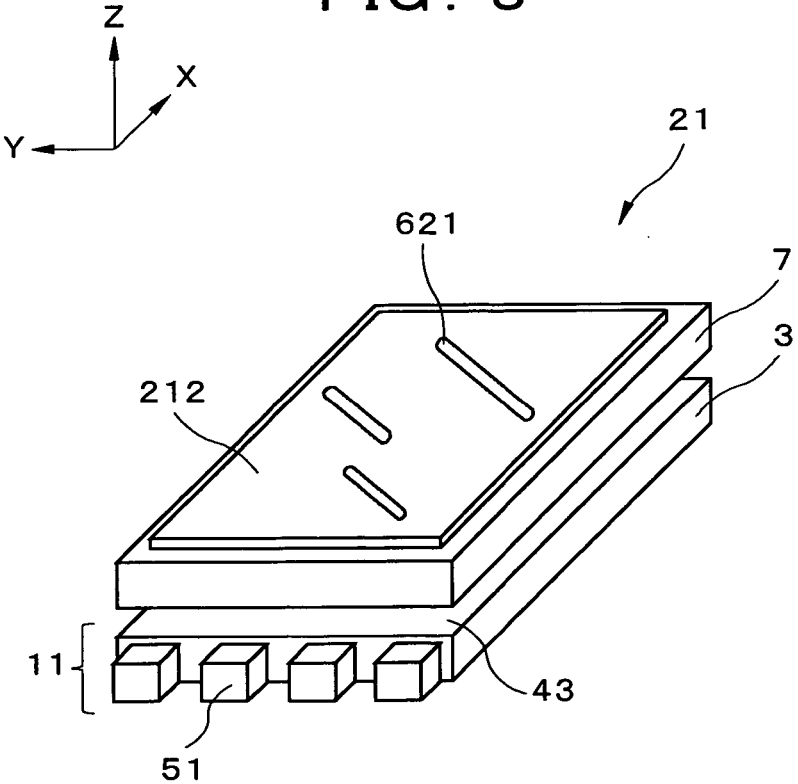
FIG. 8 is a perspective view showing the display device according to a second embodiment of the present invention.
Figure 9:
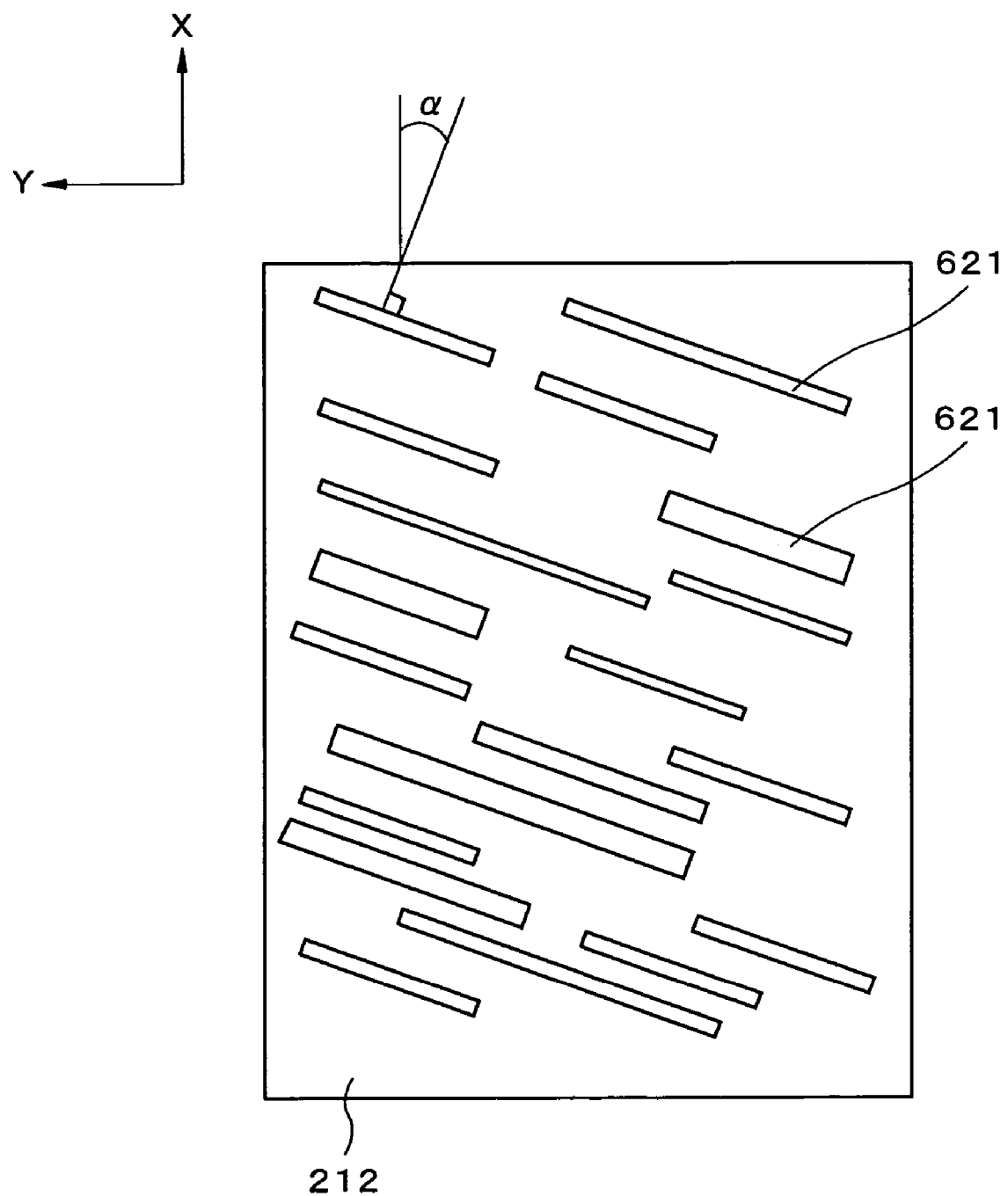
FIG. 9 is a top view showing the anisotropic scattering structure formed on the surface of the louver.
Figure 10:
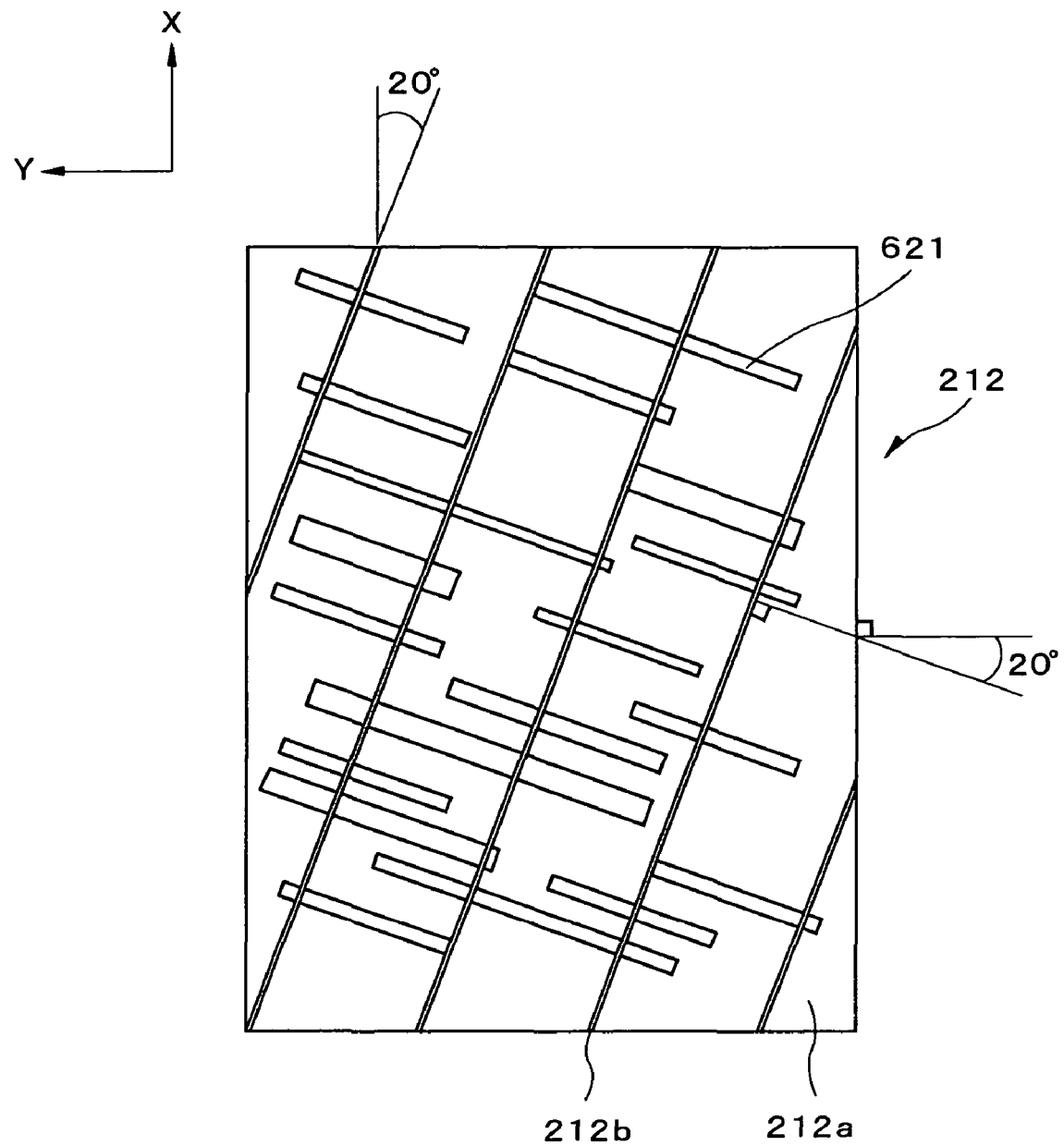
FIG. 10 is a top view showing the positional relationship between the louver and the anisotropic scattering structure.

A second embodiment of the present invention will next be described. FIG. 8 is a perspective view showing the display device according to the present embodiment; FIG. 9 is a top view showing the anisotropic scattering structure formed on the surface of the louver; and FIG. 10 is a top view showing the positional relationship between the louver and the anisotropic scattering structure. In the aforementioned first embodiment, the louver and the anisotropic scattering unit are disposed between the light source device and the transmissive liquid crystal panel. In contrast, the louver and anisotropic scattering unit are integrally formed and disposed on the user side of the transmissive liquid crystal panel in the second embodiment. The surface on the side of the transmissive liquid crystal panel on which the anisotropic scattering unit is not formed in the louver is shaped into a smooth adhesion surface with a mirror finish, and is optically bonded to the transmissive liquid crystal panel. Furthermore, the longitudinal direction of the anisotropic scattering unit is tilted with respect to the arrangement direction of the pixels. The pitch of the absorbent areas of the louver is also set to 160 μm.

Specifically, in the display device 21 according to the present embodiment as shown in FIG. 8, a light source device 11 is provided, and this light source device 11 has an optical waveguide 3 and a light source 51 provided to the side of the optical waveguide 3. A transmissive liquid crystal panel 7 is also provided on the user side, specifically, on the side of the +Z direction, of the light source device 11. The structure of the light source 51, optical waveguide 3, and transmissive liquid crystal panel 7 is the same as in the aforementioned first embodiment. Furthermore, a louver 212 as a light-direction restricting element is provided facing the +Z direction of this transmissive liquid crystal panel 7. The louver 212 is optically bonded to the transmissive liquid crystal panel 7, for example. Anisotropic scattering structures 621 are formed directly on the surface of the louver 212 facing the +Z direction.

As shown in FIG. 9, the anisotropic scattering structures 621 are belt-shaped convex portions extending in a direction that is tilted at an angle α towards the +X direction with respect to the +Y direction. Therefore, the arrangement direction thereof is tilted at an angle α towards the −Y direction with respect to the +X direction. The surface of the louver 212 facing the +Z direction is thereby provided with numerous irregularities in a specific direction (arrangement direction) that is tilted at an angle α in the −Y direction with respect to the +X direction, and has few irregularities in the direction (longitudinal direction of the anisotropic scattering structures 621) orthogonal to this specific direction.

Aspects of the configuration other than the anisotropic scattering structures 621 in the louver 212 are the same as in the louver 112 of the aforementioned first embodiment. Specifically, in the louver 212 as shown in FIG. 10, transparent areas 212a and absorbent areas 212b are arranged in alternating fashion, and the arrangement direction thereof, specifically, the light-restricting direction thereof, is tilted at an angle α towards the −Y direction with respect to the +X direction. The light-restricting direction of the louver 212 and the longitudinal direction of the anisotropic scattering structures 621 are therefore parallel to each other. The angle α is set to 20 degrees, for example. Other aspects of the configuration of the present embodiment are the same as in the aforementioned first embodiment.

The operation of the display device of the present embodiment thus configured will next be described. As shown in FIG. 8, when the light source 51 emits light, the light is incident on the optical waveguide 3, and is emitted in a plane from the light-exiting surface 43 of the optical waveguide 3. The light passes through the transmissive liquid crystal panel 7, whereby an image is associated with the light. The light emitted from the transmissive liquid crystal panel 7 then enters the louver 212, the direction of the light is restricted, and the directivity of the light is increased. These operations are the same as in the aforementioned first embodiment. This light is anisotropically scattered by the anisotropic scattering structures 621 formed on the +Z direction side of the louver 212, and is emitted from the display device 21.

Figure 11:
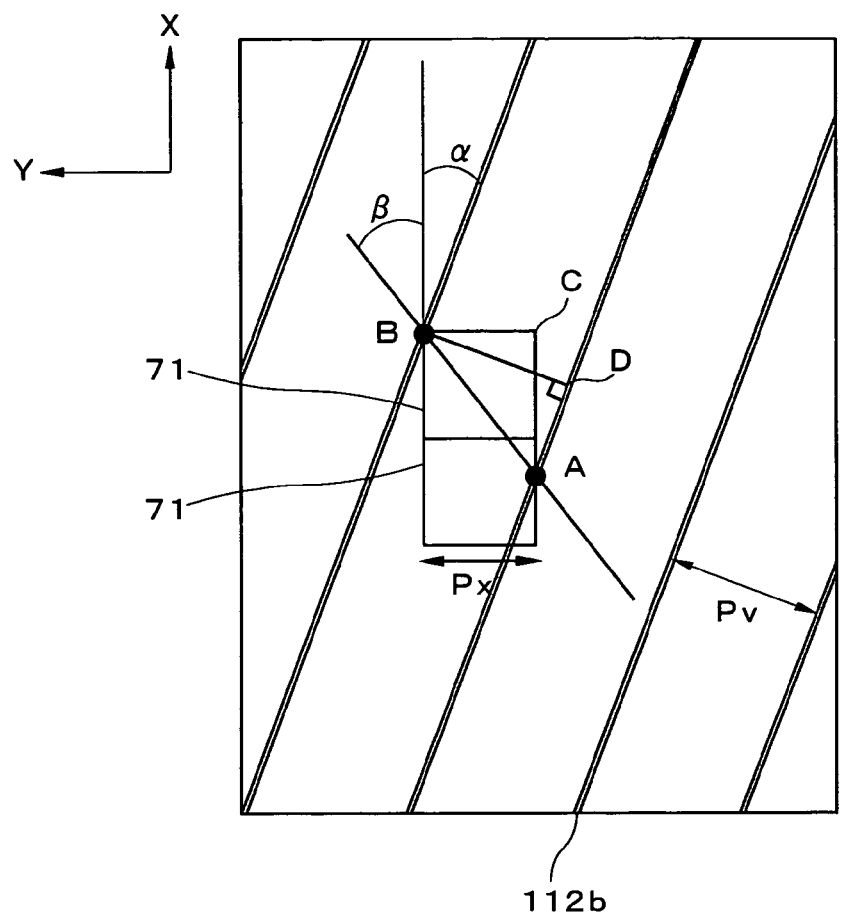
FIG. 11 is a top view showing the relationship between the light-restricting direction of the louver and the pixel arrangement direction of the transmissive liquid crystal panel in the present embodiment.

The operation by which moiré is eliminated by the anisotropic scattering structures 621 will be described in further detail hereinafter. FIG. 11 is a top view showing the relationship between the light-restricting direction of the louver 212 and the pixel arrangement direction of the transmissive liquid crystal panel 7. As previously mentioned, the transparent areas 212a for transmitting light and the absorbent areas 212b for absorbing light are arranged in alternating fashion in a direction that is tilted at an angle α towards the −Y direction from the +X direction. The angle α is 20 degrees, for example, and the pitch of the absorbent areas is set to 160 μm, for example. As also previously mentioned, numerous pixels 71 are arranged in a matrix in the X-axis direction and Y-axis direction, and the arrangement pitch thereof is set to 150 μm. Specifically, the pitch of the absorbent areas of the louver is larger than the pixel pitch in the present embodiment.

As shown in FIG. 6, since the pitch of the absorbent areas of the louver is smaller than the pixel pitch in the aforementioned first embodiment, the direction in which the moiré is tilted with respect to the X-axis direction is the same as the direction in which the absorbent areas of the louver are tilted with respect to the X-axis direction. In contrast, in the present embodiment as shown in FIG. 11, the moiré direction is tilted with respect to the X-axis direction to the opposite side from the direction in which the absorbent areas of the louver are tilted with respect to the X-axis direction.

If it is assumed that the corner on the (+X, +Y) side of a pixel 71 is point B and that the center line of one absorbent area 212b passes through this point B as viewed from the Z-axis direction, then point A will be the point of intersection between the absorbent area 212b that faces the −Y direction and is adjacent to this absorbent area 212b and the side of this pixel 71 that extends in the Y-axis direction, point C will be the corner portion on the (+X, −Y) side of this pixel 71, and point D will be the foot of the perpendicular line drawn downward from point B onto the center line of the absorbent area 212b that includes point A. If the anisotropic scattering sheet 61 were not provided, the straight line 8 linking point A and point B would be the direction in which moiré extends. The hypotenuse AB of the right triangle ABC is the same as the hypotenuse AB of the right triangle ABD, giving Eq. 4, where β is the angle formed by this moiré direction and the X-axis direction, Pv is the arrangement pitch of the absorbent areas 212b of the louver 212, and Px is the arrangement pitch of the pixels 71. Furthermore, angle β is indicated by Eq. 5 below when Eq. 4 is solved.

$$\frac{Pv}{\cos(90° - \beta - \alpha)} = \frac{Px}{\cos(90 - \beta)}$$ [Eq. 4]

$$\beta = \arctan\left(\frac{Px \times \sin\alpha}{Pv - Px \times \cos\alpha}\right)$$ [Eq. 5]

When 20 degrees for angle α, 160 μm for the pitch Pv of the absorbent areas of the louver, and 150 μm for the pixel pitch Px are substituted into the abovementioned Eq. 5, the angle β of the moiré from the X-axis direction is computed as 70 degrees. Specifically, the direction of the moiré is tilted at an angle of 70 degrees towards the +Y direction from the +X direction, as shown in FIG. 11. Since the angle α is 20 degrees, the extension direction of the absorbent areas 212b is tilted 20 degrees towards the −Y direction from the +X direction. The angle formed by the moiré direction and the extension direction of the absorbent areas therefore becomes 90 degrees. Since the arrangement direction of the moiré is orthogonal to the direction of the moiré, this direction is tilted 20 degrees towards the −Y direction from the +X direction. Since the light-restricting direction of the louver 212 is also orthogonal to the extension direction of the absorbent areas, this direction is tilted 70 degrees towards the +Y direction from the +X direction. The arrangement direction of the moiré is therefore orthogonal to the light-restricting direction of the louver 212.

As previously mentioned, the direction in which the irregularity in the anisotropic scattering structures 621 is at maximum, specifically, the direction of maximum scattering, is tilted at an angle α (20 degrees, for example) towards the −Y direction from the +X direction. Since this direction is the same as the arrangement direction of the moiré, the moiré-obscuring effects are maximized. The direction in which the irregularity in the anisotropic scattering structures 621 is at minimum, specifically, the direction of minimum scattering, is tilted at an angle β (specifically, 70 degrees) towards the +Y direction from the +X direction. Since this direction is the same as the light-restricting direction of the louver 212, the effects that compromise the light-restricting effects of the louver 212 are minimized. Moiré can therefore be reduced with maximum efficiency while the adverse effects on the light-direction restricting effects of the louver are minimized.

The effects of the present embodiment will next be described. As described above, moiré can be reduced with maximum efficiency while the adverse effects on the light-direction restricting effects of the louver are minimized in the present embodiment. The display device can also be made with a thin profile since the anisotropic scattering sheet is unnecessary. Furthermore, since the anisotropic scattering unit, the louver, and the transmissive liquid crystal panel are optically bonded, interference fringes from air layers can be prevented from occurring, and an even better display quality can be achieved. The louver is also provided on the user side of the display panel, and anisotropic scattering structures are formed in this louver. The user can therefore easily attach and detach a louver equipped with an anisotropic scattering structure according to the situation. Other effects in the present embodiment are the same as in the aforementioned first embodiment.

A case was described above in which the angle α is 20 degrees, the pitch Pv of the absorbent areas of the louver is 160 μm, and the pixel pitch Px is 150 μm, but the present embodiment is not limited by this configuration. When arbitrary values are selected for the pitches Pv and Px, the same effects as in the abovementioned example can be obtained by setting an angle α at which the value of (α+β) is 90 degrees based on the abovementioned Eq. 5.

An example was also described in the present embodiment in which anisotropic scattering structures are formed on the surface of the louver facing the user, but the present invention is not limited to this configuration. For example, the louver may be fixed to the transmissive liquid crystal panel by an anisotropic scattering adhesion layer having long oriented fibers, and the anisotropic scattering layer may be embedded in the transmissive liquid crystal panel. As an example of the latter configuration, anisotropic scattering structures may be formed on the transmissive liquid crystal panel on the surface that faces the light source device, and the polarizing plate of the transmissive liquid crystal panel or another optical sheet may be fixed to the glass substrate of the transmissive liquid crystal panel by an anisotropic scattering adhesion layer. The same effects can be obtained by this type of configuration as by the present embodiment. When the adhesion layer is endowed with anisotropic scattering effects, there is no need to provide anisotropic scattering unit to the surface of the light-direction restricting element, and cost can be reduced.

Furthermore, since the louver and anisotropic scattering structures are disposed on the user side of the display panel in the present embodiment, the display panel is not limited to a transmissive liquid crystal panel, and a reflective liquid crystal panel may be used that does not have a transparent area formed in each pixel. [The display panel] is also not limited to a liquid crystal panel, and a self-luminous display panel that does not use a backlight may be used. Examples of such self-luminous display panels include organic electroluminescent display panels, plasma display panels, CRT display panels, LED display panels, field emission display panels, PALC (Plasma Address Liquid Crystal) display panels, and the like.

Figure 12:
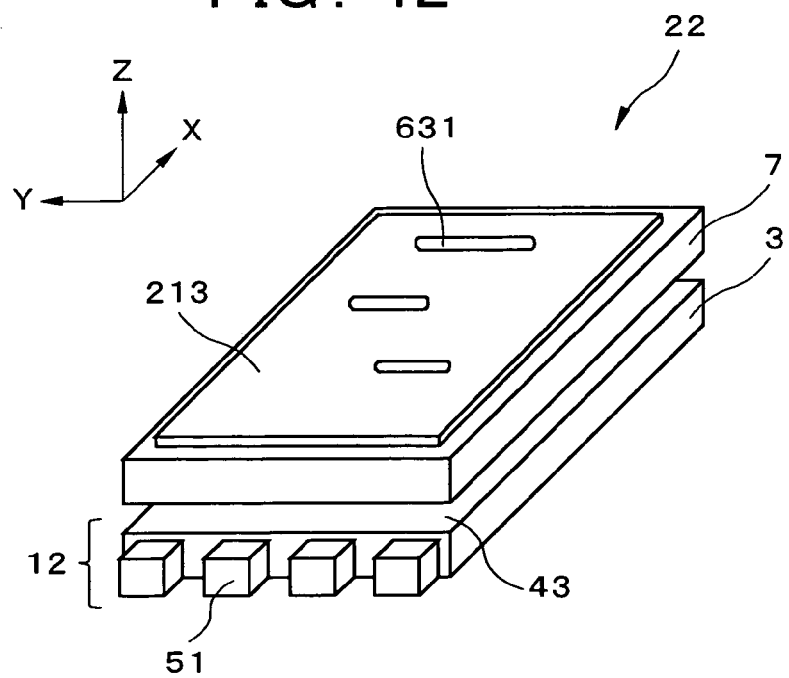
FIG. 12 is a perspective view showing the display device according to a third embodiment of the present invention.
Figure 13:
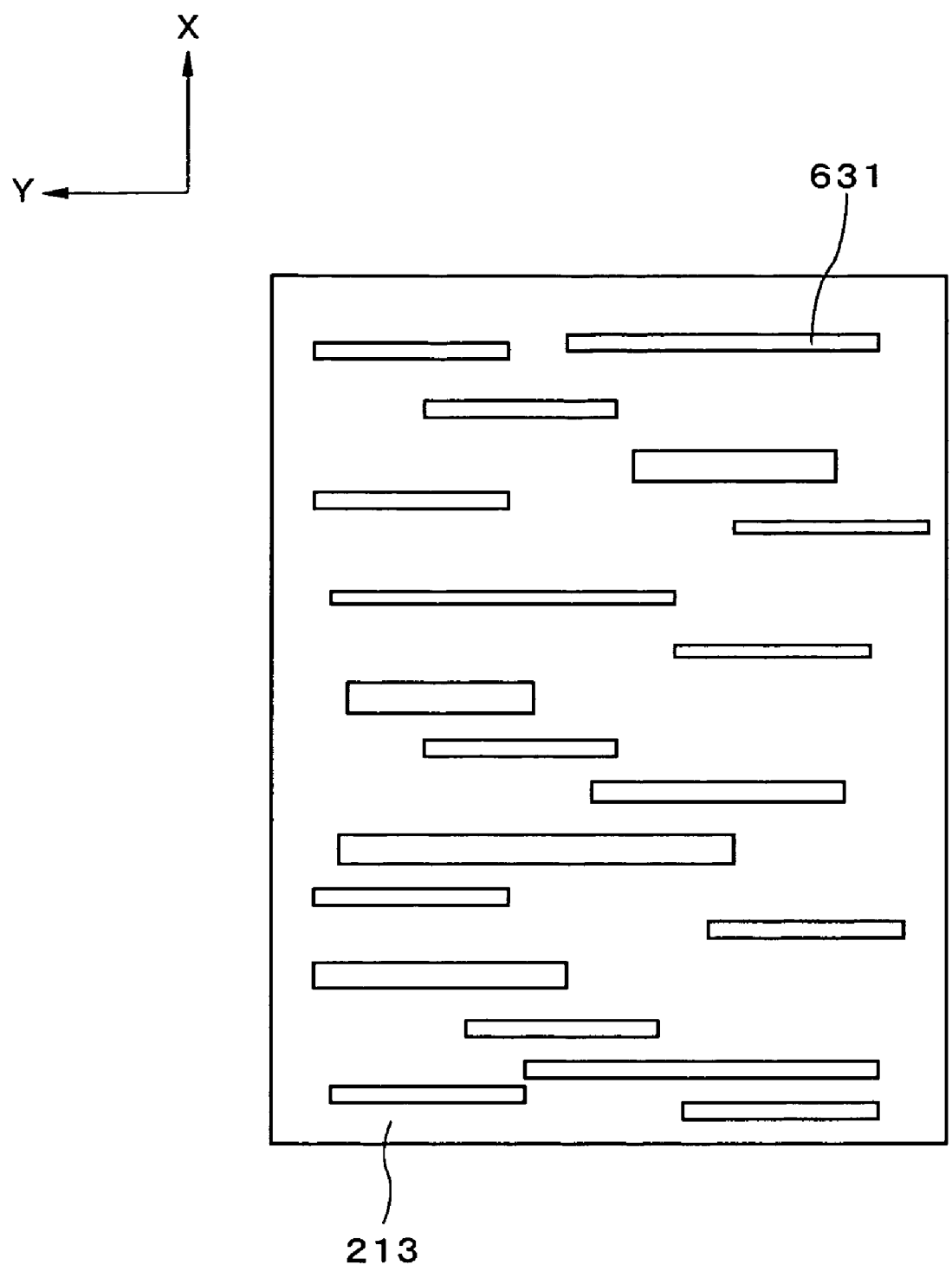
FIG. 13 is a top view showing the anisotropic scattering structure of the display device shown in FIG. 12.
Figure 14:
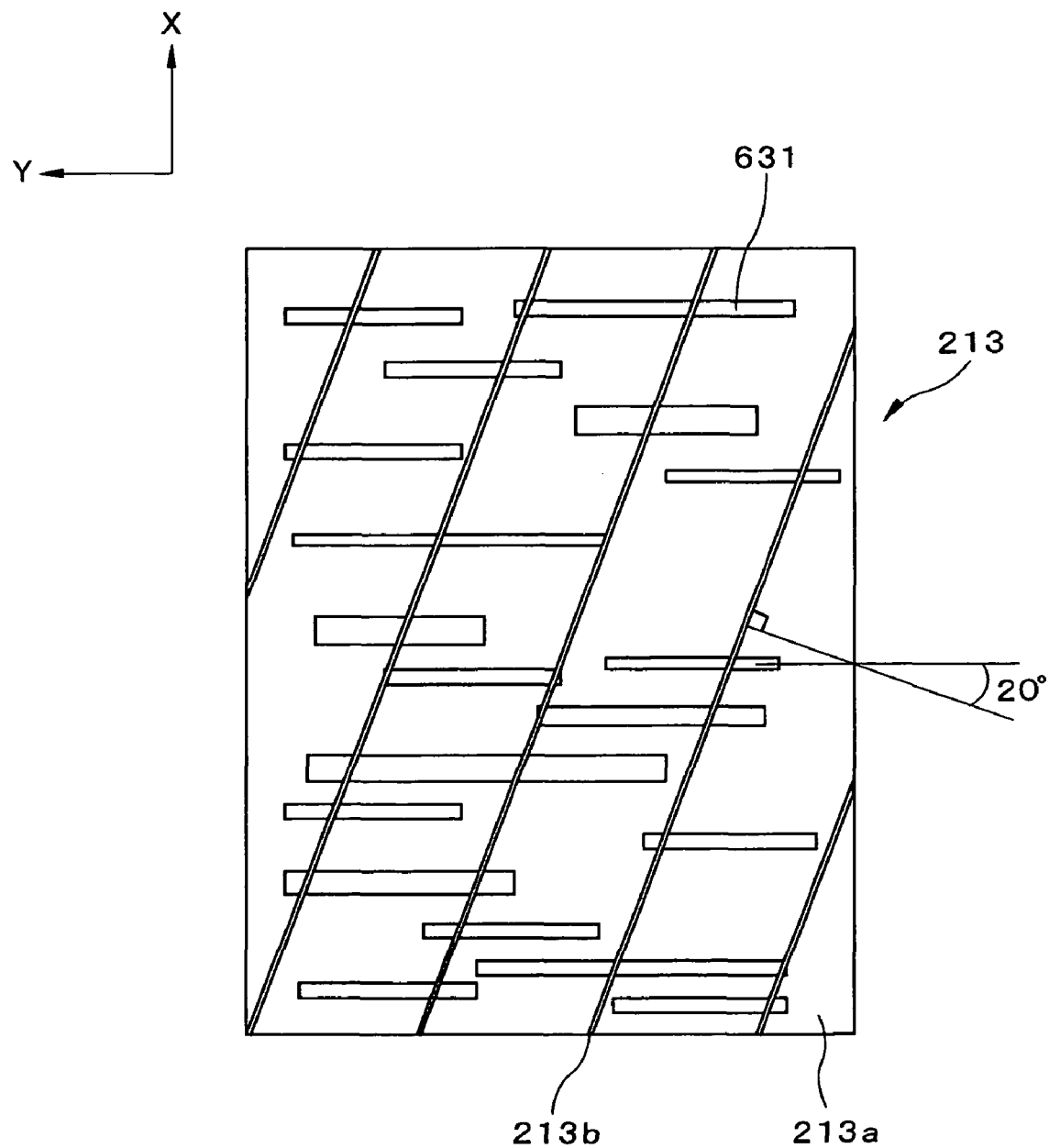
FIG. 14 is a top view showing the relationship between the light-restricting direction of the louver and the scattering direction of the anisotropic scattering structure in the display device shown in FIG. 12.

A third embodiment of the present invention will next be described. FIG. 12 is a perspective view showing the display device according to the present embodiment; FIG. 13 is a top view showing the anisotropic scattering structure of the display device shown in FIG. 12; and FIG. 14 is a top view showing the relationship between the light-restricting direction of the louver and the scattering direction of the anisotropic scattering structure in the display device shown in FIG. 12. The display device according to the present embodiment differs from the aforementioned second display device in that the longitudinal direction of the anisotropic scattering structure is the Y-axis direction, the same as in the first embodiment.

Specifically, in the same manner as in the second embodiment, the optical waveguide 3, the transmissive liquid crystal panel 7, and the louver 213 are provided in sequence in the +Z direction, specifically, in the direction towards the user, in the display device 22 according to the present embodiment, as shown in FIG. 12. The light source 51 of the light source device 12 is provided on the side of the optical waveguide 3. The light-restricting direction of the louver 213 is tilted with respect to the pixel arrangement direction. For example, the tilt is 20 degrees with respect to the Y-axis direction. Anisotropic scattering structures 631 are also formed on the louver 213 on the surface oriented in the +Z direction. However, the longitudinal direction of the anisotropic scattering structures 631 coincides with the Y-axis direction, as shown in FIG. 13. As a result, the angle formed by the longitudinal direction of the anisotropic scattering structures 631 and the light-restricting direction of the louver 213 is 20 degrees, for example, as shown in FIG. 14. Other aspects of the configuration of the present embodiment are the same as in the aforementioned second embodiment.

In the same manner as in the aforementioned first embodiment, by tilting the light-restricting direction of the louver 213 away from the pixel arrangement direction of the liquid crystal panel 7 in the present embodiment, the arrangement direction of the moiré can be made different from the light-restricting direction of the louver 213. Moreover, the anisotropic scattering structures 631 cause incident light to scatter to a large extent in the arrangement direction of the moiré, without causing significant scattering in the light-restricting direction. Moiré can thereby be reduced without significantly compromising the light-restricting effects of the louver. As a result, the directivity of the light in the frontal direction can be increased, and excellent display quality can be achieved while effectively preventing eavesdropping.

Since the anisotropic scattering effects of the anisotropic scattering structures 631 are also symmetrical with respect to the X-axis direction, it is possible to provide certain compensation for the left-right asymmetry of the light restricting effects of the louver 213, and to reduce the discomfort caused by the tilted position of the louver.

Furthermore, in the same manner as in the aforementioned second embodiment, the thickness of the display device can be reduced since the anisotropic scattering sheet is not provided in the present embodiment. Furthermore, the anisotropic scattering unit, the louver, and the transmissive liquid crystal panel are optically bonded. Therefore, interference fringes from air layers can be prevented from occurring, and the display quality can be enhanced even further. The louver is also provided on the user side of the display panel, and anisotropic scattering structures are formed in this louver. The user can therefore easily attach and detach a louver equipped with an anisotropic scattering structure according to the situation.

Figure 15:
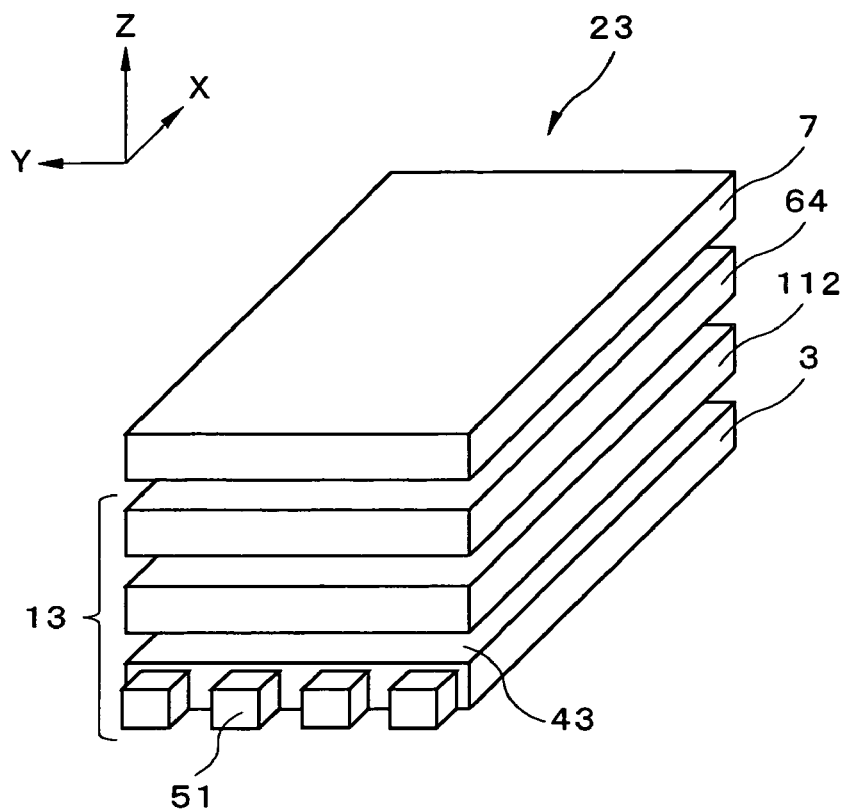
FIG. 15 is a perspective view showing the display device according to a fourth embodiment of the present invention.
Figure 16:
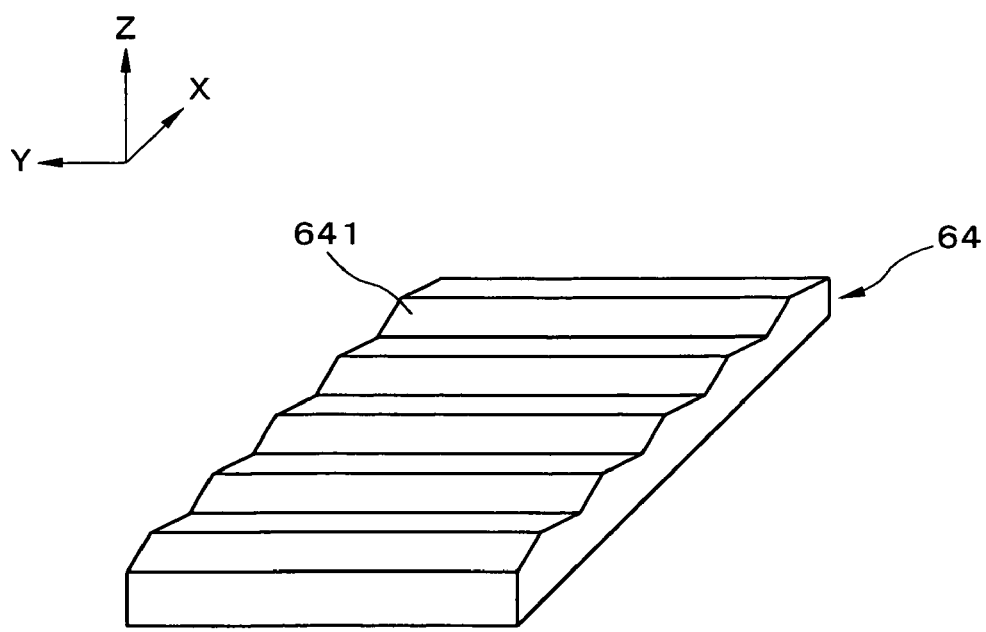
FIG. 16 is a perspective view showing the anisotropic scattering sheet of the display device shown in FIG. 15.

A fourth embodiment of the present invention will next be described. FIG. 15 is a perspective view showing the display device according to the present embodiment; and FIG. 16 is a perspective view showing the anisotropic scattering sheet of the display device shown in FIG. 15. As shown in FIGS. 15 and 16, the display device 23 according to the fourth embodiment differs from the aforementioned first embodiment in that the anisotropic scattering sheet is a one-dimensional prism sheet 64, and the anisotropic scattering structures are one-dimensionally arranged prism structures 641. In the prism sheet 64 of the light source device 13, the extension direction of the prisms coincides with the Y-axis direction. The arrangement direction of the prisms therefore coincides with the X-axis direction. Other aspects of the configuration of the present embodiment are the same as in the aforementioned first embodiment.

In the fourth embodiment thus configured, the one-dimensionally arranged prism structures 641 have scattering effects in one dimension, and the direction in which the scattering effects are demonstrated is set so that moiré is reduced. Moiré can therefore be reduced without significantly compromising the anti-eavesdropping effects, and excellent display quality can be achieved. Compared to the anisotropic scattering sheet in the aforementioned first embodiment, the scattering has an extremely high degree of anisotropy since there are no scattering effects in the longitudinal direction of the prisms. As a result, there is minimal adverse effect on the light-direction restricting effects of the louver. Operations and effects in the present embodiment other than those described above are the same as in the aforementioned first embodiment.

Figure 17:
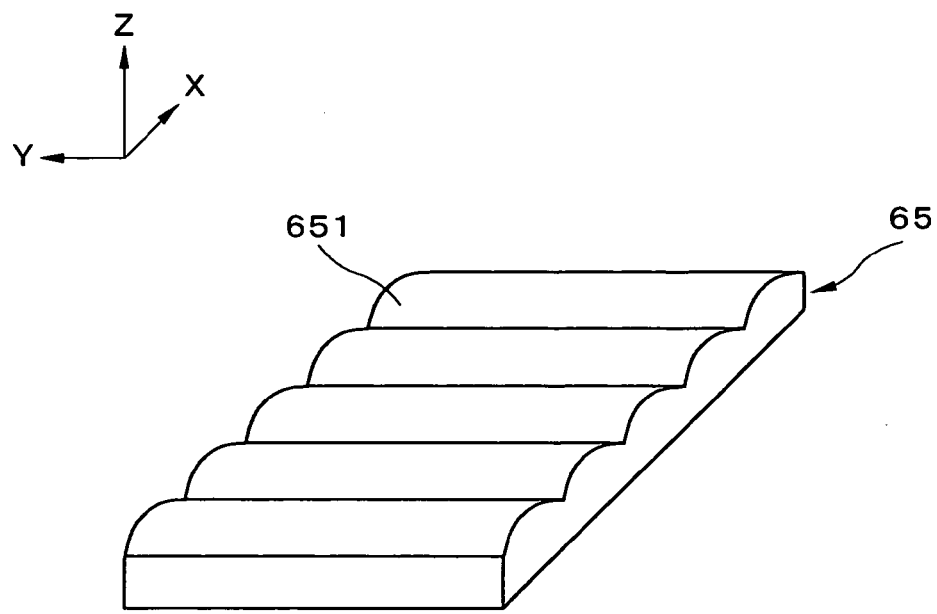
FIG. 17 is a perspective view showing the anisotropic scattering sheet in a modification of the fourth embodiment.

A modification of the fourth embodiment will next be described. FIG. 17 is a perspective view showing the anisotropic scattering sheet in the present modification. As shown in FIG. 17, a lenticular lens 65 in which cylindrical lenses 651 as anisotropic scattering structures are arranged in one dimension is provided as the anisotropic scattering sheet in the present modification. In this case, it is sufficient if the cylindrical lenses 651 are arranged in the desired direction of scattering effects. For example, in the present modification, the arrangement direction of the cylindrical lenses 651 coincides with the X-axis direction, which is the moiré arrangement direction. The same effects can thereby be obtained as in the aforementioned fourth embodiment. Other aspects of the configuration, operations, and effects in the present modification are the same as in the aforementioned fourth embodiment.

An example was described in the fourth embodiment and modification thereof in which a prism sheet or lenticular lens is provided separately from the louver, but the one-dimensionally arranged prism structures 641 may be formed directly on the surface of the louver, and the cylindrical lenses 651 may also be formed directly on the surface of the louver.

Figure 18:
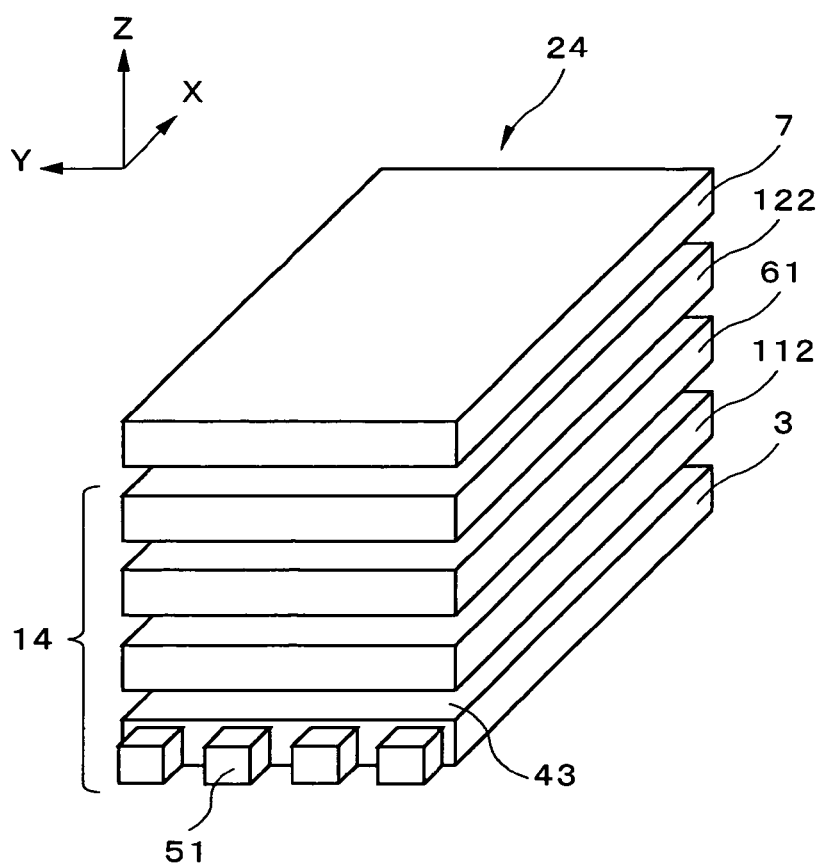
FIG. 18 is a sectional view showing the display device according to a fifth embodiment of the present invention.
Figure 19:
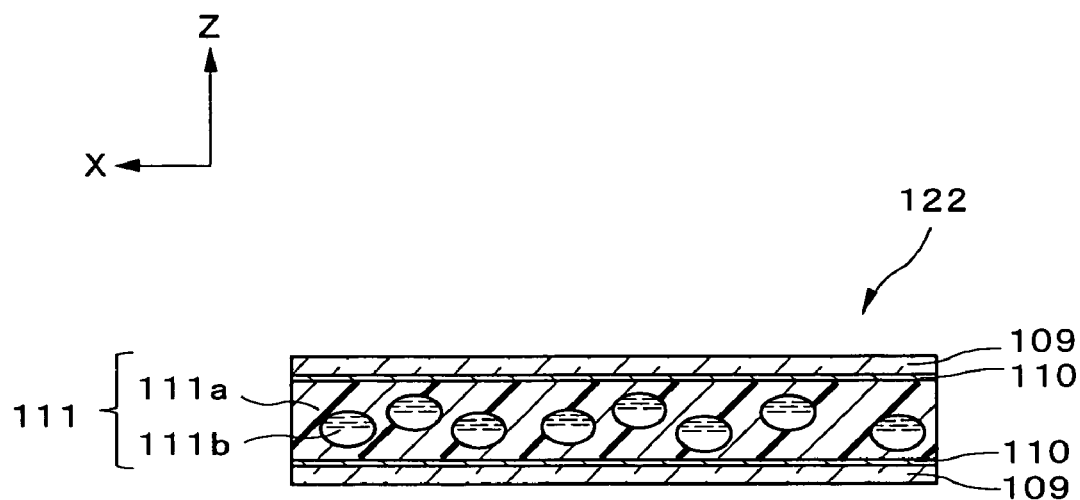
FIG. 19 is a sectional view showing the transparent/scattering state switching element in the display device shown in FIG. 18.

A fifth embodiment of the present invention will next be described. FIG. 18 is a sectional view showing the display device according to the present embodiment; and FIG. 19 is a sectional view showing the transparent/scattering state switching element in the display device shown in FIG. 18. As shown in FIG. 18, the display device 24 of the present embodiment differs from that of the first embodiment in that a transparent/scattering state switching element 122 is provided between the anisotropic scattering sheet 61 and the transmissive liquid crystal panel 7. Through the switching operation of the transparent/scattering state switching element 122 between transparent and scattering states, the display device of the present embodiment can switch between a state of narrow-angle display for narrowing the angle range of display visibility and preventing eavesdropping, and a state of wide-angle display for widening the angle range of display visibility and enabling information to be viewed by and shared with numerous people at once. Aspects of the configuration of the present embodiment other than the transparent/scattering state switching element 122 are the same as in the first embodiment.

Specifically, a light source device 14 is provided to the display device 24 according to the present embodiment, and the optical waveguide 3, louver 112, anisotropic scattering sheet 61, and transparent/scattering state switching element 122 are provided in sequence in the +Z direction in this light source device 14, and the light source 51 is provided on the side of the optical waveguide 3. The transmissive liquid crystal panel 7 is also provided facing the +Z direction of the light source device 14.

As shown in FIG. 19, a pair of transparent substrates 109 spaced apart from each other and arranged parallel to each other is provided to the transparent/scattering state switching element 122, and electrodes 110 are provided to each transparent substrate 109 so as to cover the entire surfaces that face the other transparent substrate 109. A PDLC (Polymer Dispersed Liquid Crystal) layer 111 is provided between the pair of transparent substrates 109. Liquid crystal molecules 111b are dispersed in a polymer matrix 111a in the PDLC layer 111. The PDLC layer 111 is formed, for example, by curing a mixture of a photocuring resin and a liquid crystal material by exposure to light.

The operation of the display device according to the present embodiment thus configured will next be described. In the present embodiment, the operation until the light emitted from the light source 51 passes through the anisotropic scattering sheet 61 is the same as in the first embodiment. Specifically, light emitted from the light source 51 is emitted in a plane from the light-exiting surface 43 of the optical waveguide 3, the directivity of the light in the light-restricting direction of the louver 112 is increased, and the light is selectively scattered in the X-axis direction in the anisotropic scattering sheet 61. The light emitted from the anisotropic scattering sheet 61 is then incident on the transparent/scattering state switching element 122.

In the transparent/scattering state switching element 122, the orientation state of the liquid crystal molecules 111b in the PDLC layer 111 is changed by using the pair of electrodes 110 to apply a voltage to the PDLC layer 111 sandwiched between the electrodes. The transparent/scattering state switching element 122 thus transmits or scatters incident light without modification, and emits the light to the transmissive liquid crystal panel 7.

The case of wide-angle display will first be described. In the case of a wide-angle display, a voltage is not applied to the PDLC layer 111. The liquid crystal molecules 111b are therefore randomly distributed in the polymer matrix 111a in the PDLC layer 111, and the incident light is scattered by the liquid crystal molecules 111b. Accordingly, the high-directivity light is uniformly scattered by the PDLC layer 111 and dispersed in a wide range of angles. Specifically, the light whose directivity is increased by the louver 112 is scattered by the transparent/scattering state switching element 122, and becomes wide-angle light having decreased directivity. This light having a distribution that is spread over a wide range enters the transmissive liquid crystal panel 7, an image is associated with the light, and the light is emitted without modification as wide-angle light. An image is thus displayed in a wide viewing angle.

A case of a narrow-angle display will next be described. The process until the light enters the transparent/scattering state switching element 122 is the same in the case of a narrow-angle display as it is in the case of a wide-angle display. In the case of a narrow-angle display, a prescribed voltage is applied to the PDLC layer 111. The PDLC layer 111 is thereby placed in a transparent state in which the liquid crystal molecules 111b distributed in the polymer matrix 111a are oriented. As a result, the high-directivity light incident on the transparent/scattering state switching element 122 is transmitted without modification through the transparent/scattering state switching element 122. Specifically, the light whose directivity in the light regulating direction is increased by the louver 112 is emitted from the transparent/scattering state switching element 122 in a state of distribution in which high directivity is maintained. This light having a distribution of high directivity enters the transmissive liquid crystal panel 7, an image is associated with the light, and the light is emitted in its original state of high directivity. An image is thus displayed in a narrow viewing angle.

In the fifth embodiment thus configured, the moiré created between the louver and the transmissive liquid crystal display panel is reduced by the anisotropic scattering sheet, and the display quality is enhanced. Moreover, it is possible to switch between a wide-angle display having a wide range of viewing angles that can be viewed by multiple people at once, and a narrow-angle display having a narrow range of viewing angles that is visible only to the user. Other effects in the present embodiment are the same as in the first embodiment.

An example was described in the present embodiment in which the anisotropic scattering sheet is disposed between the transparent/scattering state switching element and the louver, but this sequence of arrangement is not necessarily limiting, and the appropriate sequence of arrangement of the components may be changed insofar as the same effects are obtained. For example, the transmissive liquid crystal panel, anisotropic scattering sheet, transparent/scattering state switching element, and louver may be provided in sequence from the user side. The anisotropic scattering structures may also be formed in the surface of the louver or transparent/scattering state switching element, as in the second embodiment. Furthermore, the louver and the transparent/scattering state switching element may be fixed to each other by an anisotropic scattering adhesion layer.

The liquid crystal panel used in combination with the light source device of the present invention preferably has minimal dependence on the viewing angle. Contrast inversion during display at a wide viewing angle can thereby be suppressed. Examples of the mode of such a liquid crystal panel include IPS (In-Plane Switching), FFS (Fringe Field Switching), AFFS (Advanced Fringe Field Switching), and the like among horizontal field modes. Vertical alignment modes include MVA (Multi-domain Vertical Alignment), which is multi-domain and possesses reduced viewing-angle dependency, as well as PVA (Patterned Vertical Alignment), ASV (Advanced Super V), and the like. Furthermore, a film-compensated TN liquid crystal display panel may also be appropriately used.

The transparent/scattering state switching element is also not limited to having a PDLC layer, and any element capable of switching between a transparent state and a scattering state may be used. Examples thereof may include an element that uses a polymer network liquid crystal (PNLC), or an element that uses dynamic scattering (DS). In the present embodiment, a PDLC layer is used that is in the scattering state when a voltage is not applied, and in the transparent state when a voltage is applied. The transparent/scattering state switching element thereby no longer consumes power when in the scattering state. Therefore, the power that would have been consumed can be allocated to the backlight source, and the brightness of the light source device during the scattering state can be enhanced. It is also possible to use a PDLC layer that is in the transparent state when a voltage is not being applied, and in the scattering state when a voltage is applied. This type of PDLC layer can be obtained by exposing a mixture of a photocuring resin and a liquid crystal material to light and curing the mixture while applying a voltage. There is thereby no need for applying a voltage to the PDLC layer, and power consumption can be suppressed in a mobile information terminal in which narrow-angle display is frequently used. Cholesteric liquid crystal, ferroelectric liquid crystal, or the like may also be used as the liquid crystal molecules for the PDLC layer. Even when voltage is no longer applied, these liquid crystals retain the orientation they had when the voltage was applied, and have memory properties. By using this type of PDLC layer, it becomes possible to reduce power consumption.

Figure 20:
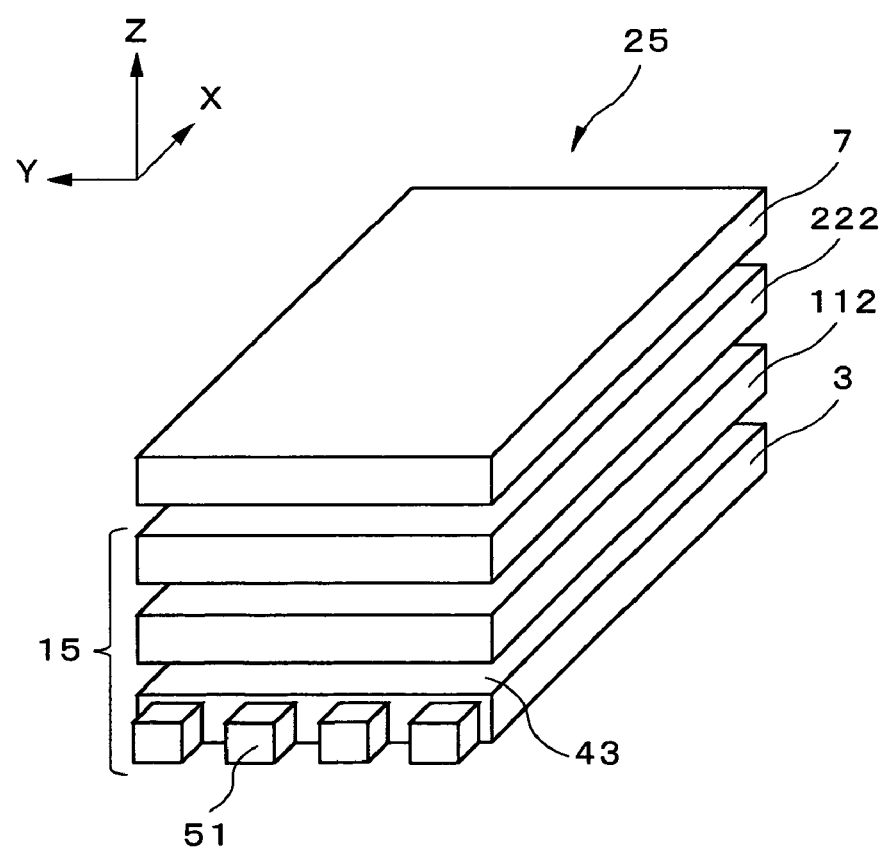
FIG. 20 is a sectional view showing the display device according to a sixth embodiment of the present invention.

A sixth embodiment of the present invention will next be described. FIG. 20 is a sectional view showing the display device according to the present embodiment. As shown in FIG. 20, the display device 25 of the present embodiment differs from that of the fifth embodiment in that an anisotropic scattering sheet is not provided, and the transparent/scattering state switching element 222 of the light source device 15 instead has anisotropic scattering properties. Specifically, the scattering in the X-axis direction by the transparent/scattering state switching element 222 is more significant than in the Y-axis direction at least in the transparent state. This type of transparent/scattering state switching element 222 can be formed using a polymer network liquid crystal (PNLC) layer in which the ratio of the polymer and the liquid crystal varies between the Y-axis direction and the X-axis direction, for example. The transparent/scattering state switching element 222 may also be composed of a PDLC layer in which liquid crystal droplets are narrowly extended in the Y-axis direction in the polymer. Other aspects of the configuration of the present embodiment are the same as in the fifth embodiment.

Figure 21:
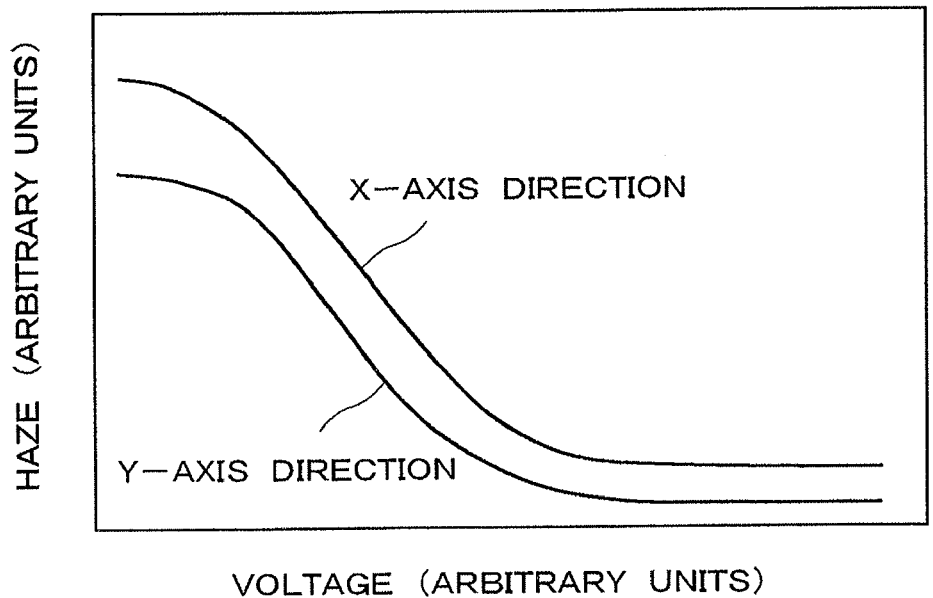
FIG. 21 is a graph showing the voltage dependency of the haze of the PNLC layer in the X-axis direction and Y-axis direction, wherein the voltage applied to the PNLC layer is plotted on the horizontal axis, and the haze of the PNLC layer is plotted on the vertical axis.
Figure 22:
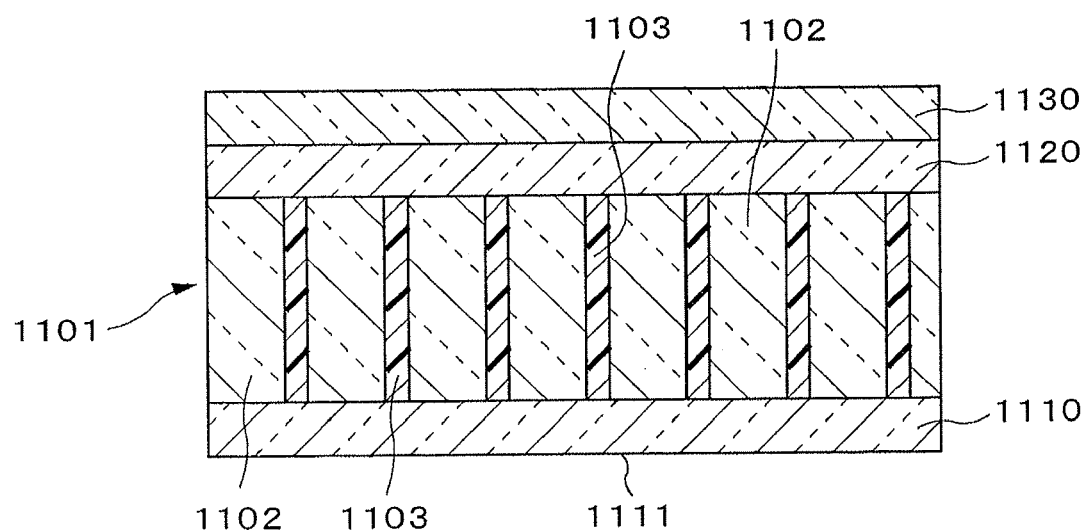
FIG. 22 is a sectional view showing the conventional anti-eavesdropping device described in Prior Art 1.
Figure 23:
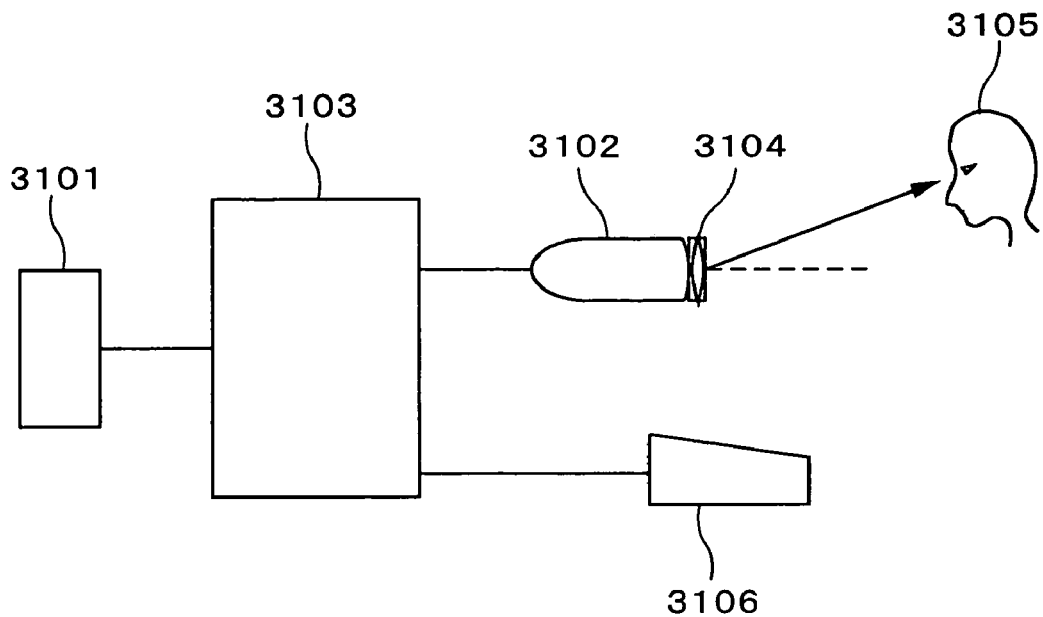
FIG. 23 is a diagram showing the raster display device provided with the conventional light control film described in Prior Art 2.
Figure 24:
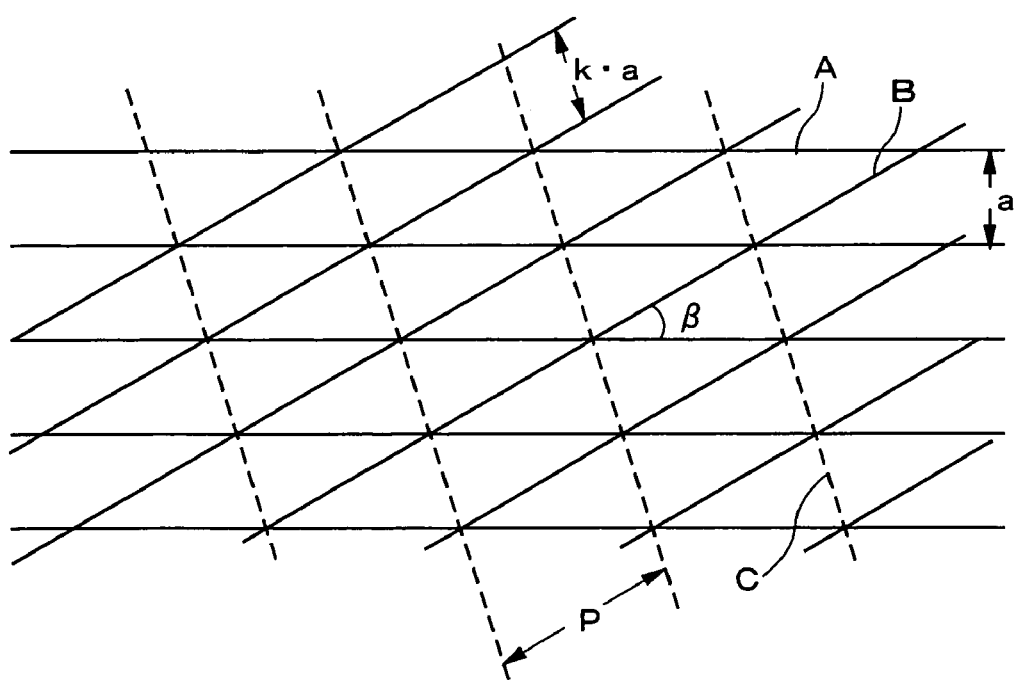
FIG. 24 is a top view showing the positioning of the light control film with respect to the display surface of the display device.
Figure 25:
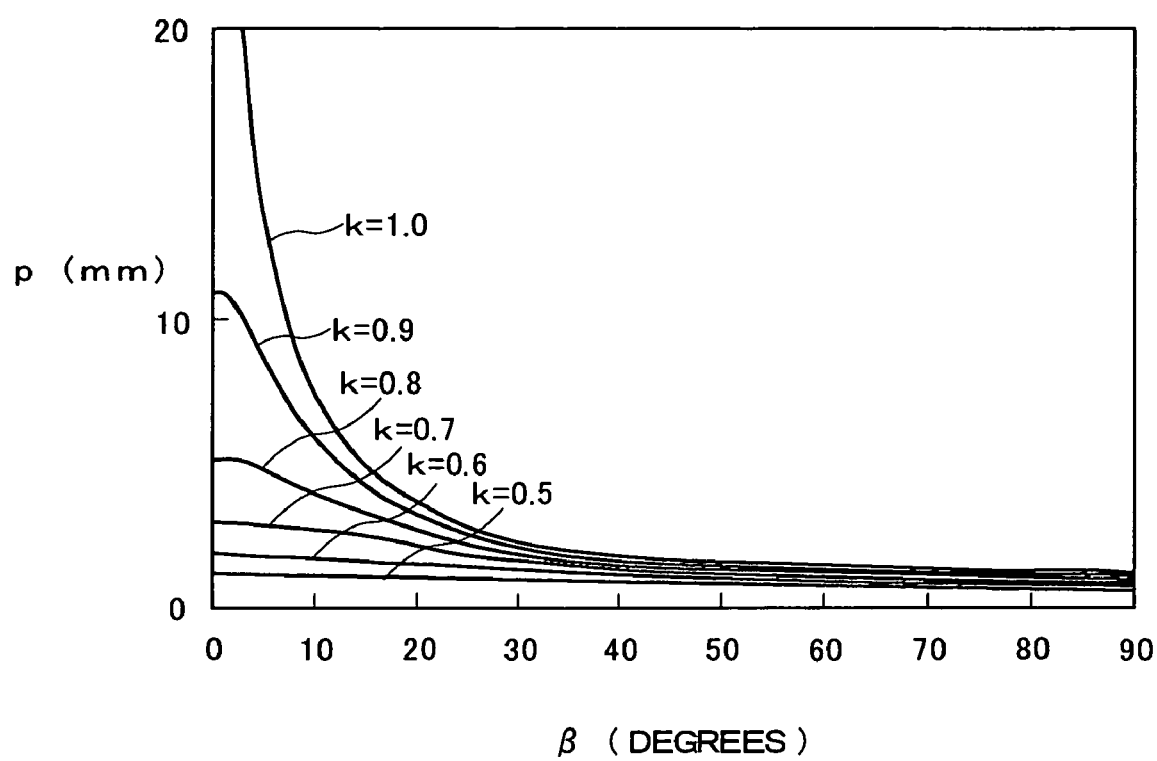
FIG. 25 is a graph showing the relationship between angle β and pitch P, wherein the angle β formed by the raster and the stripes of the light control film of the display device is plotted on the horizontal axis, and the pitch p of the moiré bar is plotted on the vertical axis.

The operation of the display device according to the present embodiment thus configured will next be described. FIG. 21 is a graph showing the voltage dependency of the haze of the PNLC layer in the X- and Y-axis directions, wherein the voltage applied to the PNLC layer is plotted on the horizontal axis, and the haze (HAZE: haze value) of the PNLC layer is plotted on the vertical axis. As shown in FIG. 21, the haze of the PNLC layer is highest during no voltage application both in the X-axis direction and in the Y-axis direction, and the haze decreases as the applied voltage is increased. The absolute value of the haze is higher in the X-axis direction than in the Y-axis direction over the entire range of voltages. Specifically, the degree of scattering is greater in the X-axis direction than in the Y-axis direction regardless of the voltage applied.

In the present embodiment, the transparent/scattering state switching element 222 scatters light mainly in the X-axis direction. Therefore, moiré arranged in the X-axis direction created between the louver and the pixels of the transmissive liquid crystal panel can be obscured without significantly compromising the light-direction restricting effects of the louver 112. In the display device according to the present embodiment, it is possible to freely switch between wide-angle display and narrow-angle display, moiré that occurs particularly during narrow-angle display can be reduced, and the display quality can be enhanced. Since the transparent/scattering state switching element functions as an anisotropic scattering element in the display device of the present embodiment, there is no need to provide an anisotropic scattering sheet or the like, and slim profile and low cost can be achieved.

The present invention can be suitable for use as the display device of a mobile telephone, a PDA, a gaming device, a digital camera, a video camera, a video player, a notebook-type personal computer, or other mobile terminal device, and as the display device of a cash dispenser, a vending machine, a monitor, a television receiver, or other fixed-mount terminal device.

What is claimed is:

1. A display device comprising:
a planar light source for emitting light in a plane;
a light-direction restricting element arranged parallel to said planar light source, including a light-exiting surface for emitting light incident from said planar light source and provided with a plurality of transparent areas and a plurality of light-absorbing areas, wherein said plurality of transparent areas and said plurality of light-absorbing areas are arranged in alternating fashion in a first direction parallel to said light-exiting surface;
a transparent/scattering state switching element arranged parallel to said light-direction restricting element and capable of switching between a state for transmitting a light incident from the light-direction restricting element and a state for scattering the light, said transparent/scattering state switching element having an anisotropic scattering property that causes said transparent/scattering state switching element to scatter a transmitted light to different degrees depending on directions parallel to a surface for emitting light when said transparent/scattering state switching element is in said state for transmitting an incident light; and
a display panel which is arranged parallel to said transparent/scattering state switching element and displays an image by transmitting the light incident from said transparent/scattering state switching element, and in which a plurality of pixels are arranged in a matrix in a second direction and a third direction orthogonal to said second direction, said second direction and said third direction being different from said first direction; wherein
said transparent/scattering state switching element scatters said light to a greatest degree in a fourth direction among said directions parallel to said surface of said transparent/scattering state switching element for emitting said light, the arrangement direction of moiré created by overlap of said display panel and said light-direction restricting element is set substantially to said third direction by arranging said light-direction restricting element and said display panel in such a manner than an angle between said first direction and said second direction is greater than 0 degrees and not exceeding 20 degrees, light is scattered and said moiré is obscured in the arrangement direction of said moiré by arranging said light-direction restricting element and said display panel in such a manner that said fourth direction accords with an arrangement direction of moiré, and said display device has only one of said light-direction restricting element.

2. The display device according to claim 1, wherein said display panel is a liquid crystal display panel.

3. The display device according to claim 2, wherein said liquid crystal display panel is a liquid crystal display panel that operates on a lateral field principle, a multi-domain vertical alignment principle, or a film-compensated TN principle.

4. A terminal device comprising the display device according to claim 1.

5. The terminal device according to claim 4, wherein a direction of maximum scattering of light by said transparent/scattering state switching element is the vertical direction of a screen of said terminal device when said transparent/scattering state switching element is in said light-transmitting state.

6. The terminal device according to claim 4, comprising a mobile telephone, a personal information terminal, a gaming device, a digital camera, a video camera, a video player, a notebook-type personal computer, a cash dispenser, or a vending machine.

7. The display device according to claim 1, wherein an angle formed between said second direction and said first direction is 20°.

* * * * *